United States Patent
Kashino et al.

(10) Patent No.: US 12,131,129 B2
(45) Date of Patent: *Oct. 29, 2024

(54) DATA GENERATION MODEL LEARNING APPARATUS, LATENT VARIABLE GENERATION MODEL LEARNING APPARATUS, TRANSLATION DATA GENERATION APPARATUS, DATA GENERATION MODEL LEARNING METHOD, LATENT VARIABLE GENERATION MODEL LEARNING METHOD, TRANSLATION DATA GENERATION METHOD, AND PROGRAM

(71) Applicants: NIPPON TELEGRAPH AND TELEPHONE CORPORATION, Tokyo (JP); The University of Tokyo, Tokyo (JP)

(72) Inventors: Kunio Kashino, Kanagawa (JP); Shota Ikawa, Tokyo (JP)

(73) Assignees: NIPPON TELEGRAPH AND TELEPHONE CORPORATION, Tokyo (JP); The University of Tokyo, Tokyo (JP)

( * ) Notice: Subject to any disclaimer, the term of this patent is extended or adjusted under 35 U.S.C. 154(b) by 382 days.

This patent is subject to a terminal disclaimer.

(21) Appl. No.: 17/613,067

(22) PCT Filed: Apr. 8, 2020

(86) PCT No.: PCT/JP2020/015793
§ 371 (c)(1),
(2) Date: Nov. 21, 2021

(87) PCT Pub. No.: WO2020/241072
PCT Pub. Date: Dec. 3, 2020

(65) Prior Publication Data
US 2022/0222450 A1 Jul. 14, 2022

(30) Foreign Application Priority Data

May 24, 2019 (JP) .................................. 2019-097309

(51) Int. Cl.
G06F 40/58 (2020.01)
G06F 40/56 (2020.01)
G10L 15/16 (2006.01)

(52) U.S. Cl.
CPC .............. *G06F 40/58* (2020.01); *G06F 40/56* (2020.01); *G10L 15/16* (2013.01)

(58) Field of Classification Search
CPC ........... G06F 40/58; G06F 40/56; G10L 15/16
See application file for complete search history.

(56) References Cited

U.S. PATENT DOCUMENTS

2008/0066138 A1* 3/2008 Bishop .................... G06F 40/58
725/137
2009/0319257 A1* 12/2009 Blume .................... G06F 40/55
704/7

(Continued)

OTHER PUBLICATIONS

Google Translation, [online], [searched on Mar. 4, 2019], the internet <URL: https://translate.google.co.jp/?hl=ja> with English translation.

(Continued)

*Primary Examiner* — Bryan S Blankenagel

(57) ABSTRACT

To provide translation techniques for translating a natural language representation in one language into a natural language representation in another language using sound. With $L_1$ and $L_2$ being different languages from each other, a translation data generation apparatus includes: a latent variable generation unit that generates, from a natural language representation in the language $L_1$, a latent variable corresponding to the natural language representation in the language $L_1$ using a language $L_1$ encoder; an index calculation (Continued)

unit that calculates an index for the natural language representation in the language $L_1$ from the natural language representation in the language $L_1$; and a natural language representation generation unit that generates a natural language representation in the language $L_2$ corresponding to the natural language representation in the language $L_1$ from the latent variable and the index for the natural language representation in the language $L_1$ using a language $L_2$ decoder.

11 Claims, 12 Drawing Sheets

(56) References Cited

U.S. PATENT DOCUMENTS

2019/0129947 A1* 5/2019 Shin ................ G06F 40/284
2020/0126544 A1* 4/2020 Scaria ............... G10L 15/22

OTHER PUBLICATIONS

Ikawa et al. (2018) "Audio Signal Search with an Onomatopoeia Query based on the Latent Variables" Acoustical Society of Japan, 2018 Autumn Meeting Acoustical Society of Japan Oita University, Oita Sep. 12-14, 2018, CD-ROM 2-2-1, published on Aug. 29, 2018 with English translation generated by computer.

NTT News Release (2019) "Development of technology to explain sounds in words ~can dictate sounds other than the spoken voice of~" May 27, 2019, <URL : https://www.ntt.co.jp/news2019/1905/190527b.html> with English translation generated by computer.

NTT communication (Booklet) Science Laboratories Open House 2019 held on May 30-31, 2019 <URL: http://www.kecl.ntt.co.jp/openhouse/2019/download.html > with its English translation generated by computer.

Ikawa et al. (2019) "Neural Audio Captioning Based on Conditional Sequence-to-Sequence Model" Detection and Classification of Acoustic Scenes and Events 2019, Oct. 25-26, 2019, New York, NY, USA, <Url: http://dcase.community/documents/workshop2019/proceedings/DCASE2019Workshop_Ikawa_82.pdf > <URL: http://dcase.community/articles/dcase2019-best-paper-awards>.

* cited by examiner

| NUMBER OF WORDS: HIGH | NUMBER OF WORDS: LOW |
|---|---|
| LOW, ECHOING SOUND | LOW SOUND |
| A SHORT WHISTLE BLOWS ONLY MOMENTARILY | A WHISTLE BLOWS |

HIGHER ⇐          ⇒ LOWER

| Sound source | Model | c | Generated captions |
|---|---|---|---|
| Snapping fingers | SCG | | A light sound is produced only momentarily. |
| | CSCG | 20 | Fingers are snapped. |
| | | 50 | Sound without pitch like a finger snap is produced once. |
| | | 80 | A short, light sound without pitch like a finger snap is produced once at low volume. |
| | | 110 | A short, light sound without pitch like a finger snap is produced once at low volume. |
| Bass drum | SCG | | A low sound echoes only momentarily. |
| | CSCG | 20 | A low sound is produced only momentarily. |
| | | 50 | A low hitting sound like a bang against Tatami booms only momentarily. |
| | | 80 | A drum is played only once at very low pitch unenthusiastically. |
| | | 110 | A light and a little low sound like hitting something is produced momentarily at very low pitch unenthusiastically and immediately goes off. |
| Contrabass | SCG | | A car engine echoes at low pitch. |
| | CSCG | 20 | A low sound is echoing. |
| | | 50 | A dull and low sound is echoing. |
| | | 80 | A slightly low machine sound gradually lowers and braking sound starts to be heard. |
| | | 110 | A slightly low machine sound gradually lowers and braking sound starts to be heard. |

FIG. 5

| MODEL | $c$ | MEAN | STANDARD DEVIATION |
|---|---|---|---|
| SCG | | 38.0 | 21.2 |
| CSCG | 20 | 21.7 | 2.4 |
| | 50 | 57.7 | 5.0 |
| | 80 | 90.5 | 9.5 |
| | 110 | 107.2 | 20.6 |

FIG. 6

DATA GENERATION MODEL LEARNING APPARATUS, LATENT VARIABLE GENERATION MODEL LEARNING APPARATUS, TRANSLATION DATA GENERATION APPARATUS, DATA GENERATION MODEL LEARNING METHOD, LATENT VARIABLE GENERATION MODEL LEARNING METHOD, TRANSLATION DATA GENERATION METHOD, AND PROGRAM

CROSS-REFERENCE TO RELATED APPLICATIONS

This application is a U.S. National Stage Application filed under 35 U.S.C. § 371 claiming priority to International Patent Application No. PCT/JP2020/015793, filed on 8 Apr. 2020, which application claims priority to and the benefit of JP Application No. 2019-097309, filed on 24 May 2019, the disclosures of which are hereby incorporated herein by reference in their entireties.

TECHNICAL FIELD

The present invention relates to techniques for translating a natural language representation, such as a sentence, in one language into a natural language representation in another language.

BACKGROUND ART

Translation services for translating a sentence written in one language (for example, English) into a sentence written in another language (for example, Japanese) have been provided on the internet. For example, Google Translation, listed as Non-Patent Literature 1, is one example of them. To realize such a translation service, it is necessary to have a translation model that takes a sentence in one language A as input and outputs a sentence in another language B. Such a translation model is basically learned through supervised learning using pairs of sentences in language A and sentences in language B that correspond to those sentences as learning data.

PRIOR ART LITERATURE

Non-Patent Literature

Non-Patent Literature 1: Google Translation, [online], [searched on Mar. 4, 2019], the internet <URL: https://translate.google.co.jp/?hl=ja>

SUMMARY OF THE INVENTION

Problems to be Solved by the Invention

In learning of a traditional translation model, it has been difficult to make use of sensory data, such as sound, in addition to correspondence between language A and language B. This is probably because while utilizing sound in learning of a translation model requires translating sound (representing sound as text), it has been difficult with translation of sound to provide translation including detailed depiction, such as what kind of tone a sound represents, although translation is possible for a source of the sound. From these circumstances, it has been difficult to achieve translation with a certain level of accuracy by making use of sound.

Accordingly, an object of the present invention is to provide translation techniques for translating a natural language representation in one language into a natural language representation in another language using sound.

Means to Solve the Problems

With $L_1$ and $L_2$ being different languages from each other, an aspect of the present invention includes: a latent variable generation unit that generates, from a natural language representation in the language $L_1$, a latent variable corresponding to the natural language representation in the language $L_1$ using a language $L_1$ encoder; an index calculation unit that calculates an index for the natural language representation in the language $L_1$ from the natural language representation in the language $L_1$; and a natural language representation generation unit that generates a natural language representation in the language $L_2$ corresponding to the natural language representation in the language $L_1$ from the latent variable and the index for the natural language representation in the language $L_1$ using a language $L_2$ decoder.

Effects of the Invention

The present invention enables accurate translation using sound.

BRIEF DESCRIPTION OF THE DRAWINGS

FIG. 5 shows experiment results.

FIG. 6 shows experiment results.

DETAILED DESCRIPTION OF THE EMBODIMENTS

Figure 1:
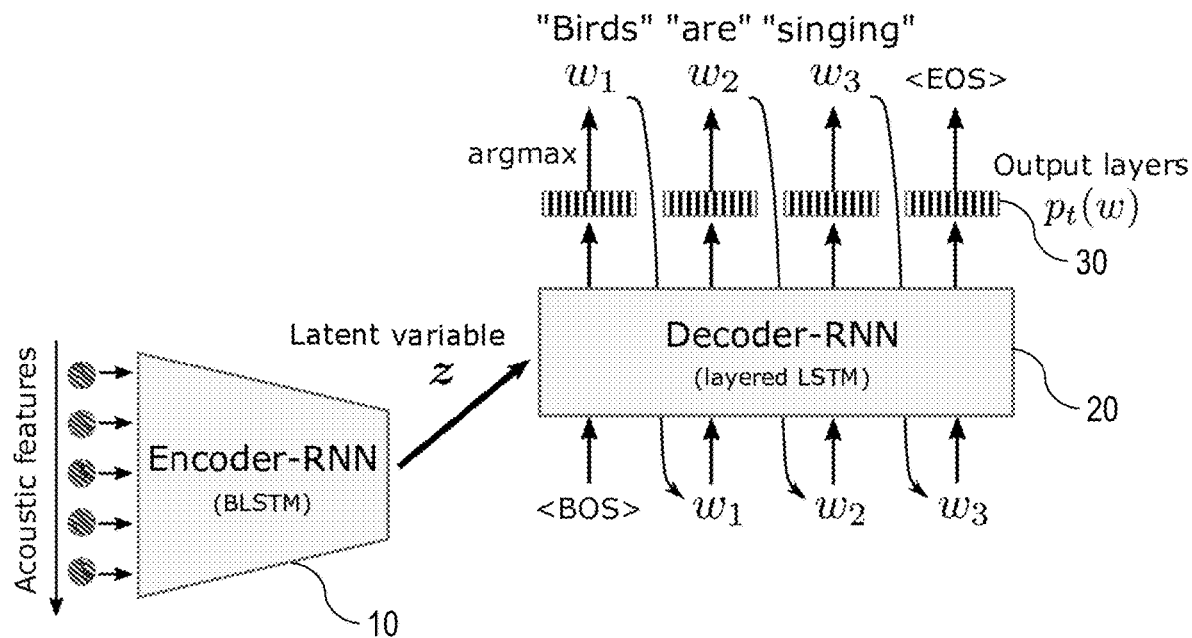
FIG. 1 illustrates an SCG.

Embodiments of the present invention are now described in detail. Components with the same functions are denoted with the same reference characters and overlapping descriptions are not repeated.

Prior to describing the embodiments, denotations used herein are described.

A "^" (caret) represents a superscript. For example, $x^{y^\wedge z}$ means that $y^z$ is a superscript to x and $x_{y^\wedge z}$ means that $y^z$ is a subscript to x. A "_" (underscore) represents a subscript. For example, $x^{y\_z}$ means that $y_z$ is a superscript to x and $x_{y\_z}$ means that $y_z$ is a subscript to x.

Although superscripts "^" and "~" like ^x or ~x for a certain letter x are supposed to be indicated right above "x", they are indicated as ^x and ~x due to limitations of text notation in a specification.

TECHNICAL BACKGROUND

Embodiments of the present invention use a sentence generation model when generating a sentence corresponding to a sound signal from the sound signal. A sentence generation model herein refers to a function that takes a sound signal as input and outputs a corresponding sentence. A sentence corresponding to a sound signal refers to a sentence that describes what kind of sound the sound signal represents (a descriptive sentence for the sound signal), for example.

First, as an example of the sentence generation model, a model called sequence-to-sequence caption generator (SCG) is shown.

<<SCG>>

The SCG is an encoder-decoder model that employs the recurrent language model (RLM) described in Reference Non-Patent Literature 1 as decoder, as shown in FIG. 1.
(Reference Non-Patent Literature 1: T. Mikolov, M. Karafiat, L. Burget, J. Cernocký, and S. Khudanpur, "Recurrent neural network based language model", In INTER-SPEECH 2010, pp. 1045-1048, 2010.)

The SCG is described with reference to FIG. 1. The SCG generates, from an input sound signal, a sentence corresponding to the sound signal through the following steps and outputs it. Instead of a sound signal, acoustic features extracted from the sound signal, for example, a sequence of Mel-frequency cepstrum coefficients (MFCC), may be used, for example. A sentence as text data is a sequence of words.

(1) The SCG extracts a latent variable z, which is a distributed representation of sound, from the sound signal via an encoder 10. The latent variable z is represented as a vector of predetermined dimensions (for example, 128 dimensions). The latent variable z can be said to be a summarized feature of the sound signal containing sufficient information for sentence generation. Accordingly, the latent variable z can also be said to be a fixed-length vector having both the features of the sound signal and those of the sentence.

(2) The SCG generates a sentence by sequentially outputting word Wt at time t (t=1, 2, . . . ) from the latent variable z via the decoder 20. An output layer 30 of the decoder 20 outputs the word Wt at time t based on a probability of generation $p_t(w)$ of a word at time t according to the following formula:

$$w_t = \underset{w}{\operatorname{argmax}}\, p_i(w)$$

FIG. 1 represents that word $w_1$ at time t=1 is "Birds", word $w_2$ at time t=2 is "are", and word $w_3$ at time t=3 is "singing", and the sentence "Birds are singing" is generated. <BOS> and <EOS> in FIG. 1 are a start symbol and an end symbol, respectively.

The encoder 10 and the decoder 20 constituting the SCG can be any kind of neural networks that can process time-series data. For example, a recurrent neural network (RNN) or a long short-term memory (LSTM) may be used. "BLSTM" and "layered LSTM" in FIG. 1 represent bi-directional LSTM and multi-layered LSTM, respectively.

The SCG is learned through supervised learning that uses pairs of sound signals and sentences corresponding to those sound signals (these sentences are referred to as teaching data) as supervised learning data. The SCG is learned by error backpropagation with an error function $L_{SCG}$, which is a total sum of cross entropies of the word output by the decoder 20 at time t and the word at time t contained in a sentence as teaching data.

Sentences as output by the SCG resulting from such learning have variations in detailedness of their descriptions. This is due to the following reason. For one sound signal, there is more than one correct sentences. In other words, for one sound signal, there can be a number of "correct sentences" varying in detailedness of description. For example, for one sound signal, there can be multiple correct sentences that describe what the sound signal is like, such as "a low sound is produced", "a musical instrument is being played for a while", and "a stringed instrument starts to be played at low pitch and then the volume lowers slowly", and which one of these sentences is preferable depends on the scene. For example, in some scenes a brief description is desired, while in other scenes a detailed description is desired. Thus, if learning of the SCG is performed without discriminating sentences that are different in detailedness of description, the SCG would be unable to control trends in sentences to be generated.

<<Specificity>>

To resolve the problem of variations outlined above, specificity to serve as an index indicating the degree of detailedness of a sentence is defined. Specificity $I_s$ of a sentence s which is a sequence of n words $[w_1, w_2, \ldots, w_n]$ is defined by the following formula:

$$I_s = \sum_{t=1}^{n} I_{w_t}$$

Here, $I_{w\_t}$ is an information content of the word $w_t$, which is determined based on a probability of appearance $p_{w\_t}$ of the word $w_t$. For example, it may be $I_{w\_t} = -\log(p_{w\_t})$. The probability of appearance $p_{w\_t}$ of the word $w_t$ can be determined using a descriptive sentence database, for example. A descriptive sentence database is a database that stores one or more sentences describing each one of multiple sound signals, and the probability of appearance of a word can be determined by determining the frequency of appearance of each word contained in sentences included in the descriptive sentence database and dividing the frequency of appearance of that word by the sum of the frequencies of appearance of all the words.

Figure 2:
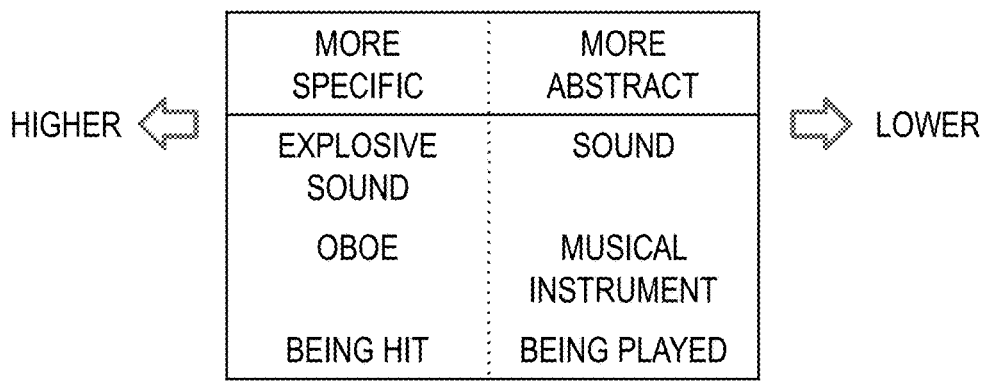
FIG. 2 illustrates specificity of a sentence.

Specificity defined in this manner has the following characteristics:

(1) Specificity is higher with a sentence that uses a word representing a specific object or action (see FIG. 2).

This is because such a word has a lower frequency of appearance and has higher information content.

Figures 3, 4:
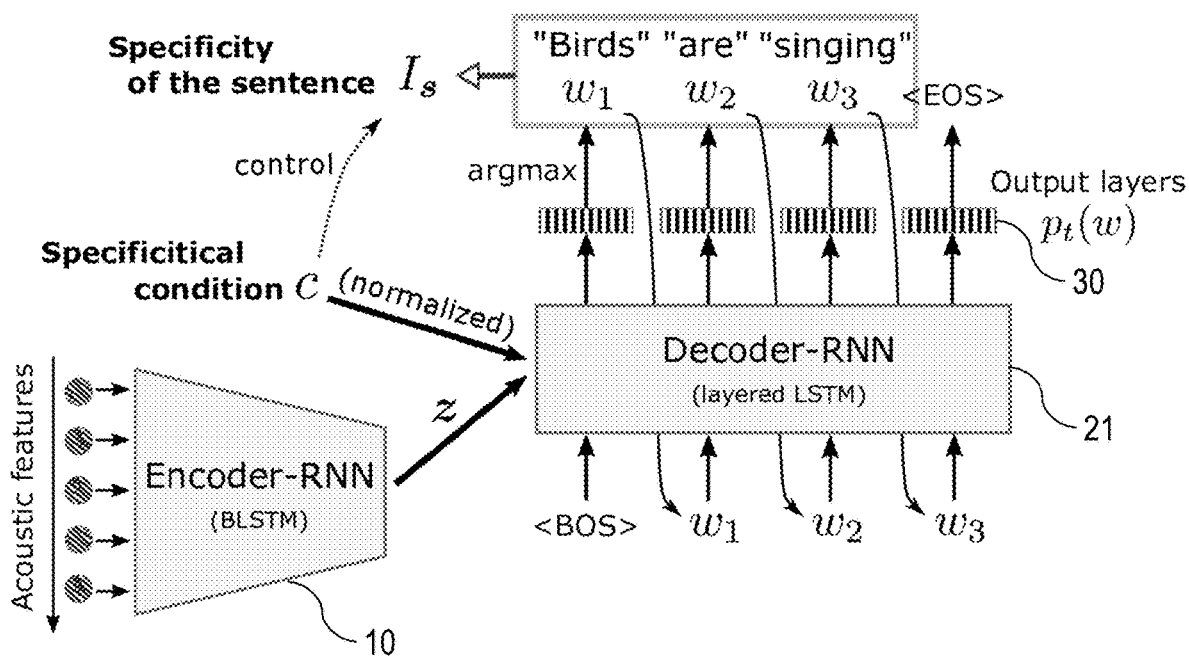
FIG. 3 illustrates specificity of a sentence.
FIG. 4 illustrates a CSCG.

(2) Specificity is higher with a sentence that uses a larger number of words (see FIG. 3).

An optimal value of specificity differs depending on the nature of a sound of interest or application. For example, when a sound should be depicted more specifically, the specificity of a sentence is preferably higher; whereas when a brief description is desired, the specificity of a sentence is preferably lower. As another problem, a sentence of high specificity tends to be inaccurate. Accordingly, it is important to be able to generate a sentence corresponding to a sound signal while freely controlling the specificity in accordance with granularity of information required for the description of the sound signal. As one model that enables such sentence generation, conditional sequence-to-sequence caption generator (CSCG) is described.

<<CSCG>>

As with the SCG, the CSCG is an encoder-decoder model that uses the RLM as decoder. However, the CSCG controls the specificity of the sentence to be generated by conditioning the decoder (see FIG. 4). The conditioning is made by giving a condition concerning the specificity of the sentence (specificitical condition) as an input to the decoder. Here, a condition concerning the specificity of the sentence is designation of a condition concerning the specificity of the sentence to be generated.

Referring to FIG. 4, the CSCG is described. The CSCG generates a sentence corresponding to an input sound signal from the sound signal and from a condition concerning the specificity of the sentence through the following steps and outputs it.

(1) The CSCG extracts the latent variable z, which is a distributed representation of sound, from the sound signal via the encoder 10.

(2) The CSCG generates a sentence by sequentially outputting the word at time t (t=1, 2, . . . ) from the latent variable z and a condition C on the specificity of the sentence via the decoder 21. The generated sentence will be a sentence that has specificity close to the condition C concerning the specificity of the sentence. FIG. 4 shows that the specificity Is of the generated sentence s="Birds are singing" is close to the condition C concerning the specificity of the sentence.

The CSCG can be learned through supervised learning using learning data that are pairs of sound signals and sentences corresponding to those sound signals (hereinafter referred to as first learning data) (hereinafter referred to as first learning). The CSCG can also be learned through the first learning using the first learning data and supervised learning using learning data that are pairs of specificities of sentences and sentences corresponding to the specificities (hereinafter referred to as second learning data) (hereinafter referred to as second learning). In this case, the CSCG is learned by alternately executing the first learning and the second learning each for one epoch, for example. The CSCG is also learned by executing the first learning and the second learning such that the two types of learning are mixed in a certain manner, for example. In doing so, the number of times the first learning is executed and the number of times the second learning is executed may be different values.

(1) The First Learning

Sentences corresponding to sound signals (that is, sentences as elements of teaching data) for use are manually provided ones. In the first learning, the specificity of a sentence corresponding to a sound signal is determined and included into the teaching data. The first learning performs learning so as to achieve minimization of $L_{SCG}$, which is an error between a generated sentence and a sentence as teaching data, and minimization of $L_{sp}$, which is an error related to specificity, at the same time. An error function $L_{CSCG}$ can be one that is defined with the two errors, $L_{SCG}$ and $L_{sp}$. For example, the error function $L_{CSCG}$ can be a linear sum of the two errors like the following formula:

$$L_{CSCG} = L_{SCG} + \lambda L_{sp}$$

Here, $\lambda$ is a predetermined constant.

Specific definition of the error $L_{sp}$ is discussed later.

(2) The second learning

When the number of the first learning data is low, learning the CSCG only with the first learning can make the CSCG excessively adapted to sound signals that are elements of the first learning data and specificity can less likely be reflected appropriately. Thus, in addition to the first learning with the first learning data, the decoder 21 constituting the CSCG is learned through the second learning with the second learning data.

In the second learning, the decoder 21 being learned is used to generate a sentence corresponding to a specificity c which is an element of the second learning data, and the decoder 21 is learned so as to minimize the error $L_{sp}$ using a sentence that is an element of the second learning data as teaching data for the generated sentence. The specificity c as an element of the second learning data may be one generated in a predetermined manner such as by random number generation. A sentence as an element of the second learning data is a sentence having specificity close to the specificity c (that is, with a difference from the specificity c being smaller than a predetermined threshold or equal to or smaller than a predetermined threshold).

Specifically, normalization is applied using $L_{SCG}$, which is an error between a generated sentence and a sentence having specificity close to c.

$$L_{CSCG} = \lambda' L_{SCG} - \lambda L_{sp}$$

Here, $\lambda'$ is a constant satisfying $\lambda' < 1$.

By executing the second learning in addition to the first learning, generalization performance of the CSCG can be improved.

The error $L_{sp}$ can also be defined as the difference between the specificity of a generated sentence and the specificity of the sentence as teaching data in the case of the first learning, and as the difference between the specificity of a generated sentence and the specificity given as teaching data in the case of the second learning. However, when the error $L_{sp}$ is defined in this manner, an error cannot be back-propagated because discretization into one word is performed at a point when the output at time t is obtained. Accordingly, in order to enable learning by error backpropagation, it is effective to use an estimated value of the specificity of a generated sentence instead of the specificity. For example, an estimated specificity $\hat{I}_s$ of a generated sentence s can be one defined by the following formulas:

$$\hat{I}_s = \sum_t E(I_{w_{t,j}})$$

$$E(I_{w_{t,j}}) = \sum_j I_{w_{t,j}} p(w_{t,j})$$

Here, the value $p(w_{t,j})$ of unit j of the output layer 30 of the decoder 21 at time t is the probability of generation of word $w_{t,j}$ corresponding to the unit j, and $I_{w\_t,j}$ is the information content of the word $w_{t,j}$, which is determined based on the probability of generation $p_{w\_t,j}$ of the word $w_{t,j}$.

Then, the error $L_{sp}$ is defined as the difference between the estimated specificity $\hat{I}_s$ and the specificity of the sentence as teaching data in the case of the first learning, and as the difference between the estimated specificity $\hat{I}_s$ and the specificity given as the teaching data in the case of the second learning.

<<Experiment>>

In this section, results of an experiment for verifying the effect of sentence generation with the CSCG are explained. The experiment was conducted for the two purposes:

(1) Verifying controllability with specificity; and (2) Evaluating the quality of generated sentences by subjective evaluation concerning acceptability.

First, data used in the experiment is described. From sound signals (within 6 seconds) that were acquired by recording sound events such as musical instrument sound and voice, 392 sound sources with descriptive sentences (supervised learning data) and 579 sound sources without descriptive sentences (unsupervised learning data) were generated. In generating the sound sources with descriptive sentences, one to four descriptive sentences were given to each sound source. The total number of descriptive sentences given is 1113. These descriptive sentences were generated by asking subjects to listen to each sound source and write a sentence describing what kind of sound it is. Further, by making partial deletion and replacement to the 1113 descriptive sentences, they were increased to 21726 descriptive sentences and the 21726 descriptive sentences were used to build a descriptive sentence database.

The experiment results are now explained. The experiment results were evaluated in the form of comparison between the SCG and the CSCG. In the experiment, sentences were generated using a learned SCG and a learned CSCG.

Experiment results related to the purpose (1) are described first. FIG. 5 is a table showing what kinds of sentences were generated by the SCG and the CSCG for certain sound sources. For example, it shows that for a sound source of snapping fingers, the sentence "a light sound is produced only momentarily" (a generated caption) was generated by the SCG and the sentence "fingers are snapped" was generated by the CSCG with a specificity of 20. FIG. 6 is a table showing the means and standard deviations of specificity for the respective models. These statistics were calculated from the results of generating sentences with 29 sound sources as test data. From the table of FIG. 6, the followings can be seen in relation to specificity:

(1) The SCG has a very large standard deviation in specificity.

(2) The CSCG generated sentences having specificity responsive to the value of the input specificity c and has a small standard deviation compared that of the SCG. However, the standard deviation becomes larger as the input specificity c is higher. This is probably because variations become larger due to absence of a descriptive sentence that fits sound while having specificity close to the input specificity c.

It can be seen that the CSCG is able to reduce variations in the specificity of generated sentences and generate sentences appropriate for the specificity.

Experiment results related to the purpose (2) are described next. First, whether sentences generated with the SCG could be subjectively accepted was evaluated on a scale of four levels. Then, sentences generated with the SCG and sentences generated with the CSCG were compared and evaluated.

Figure 7:
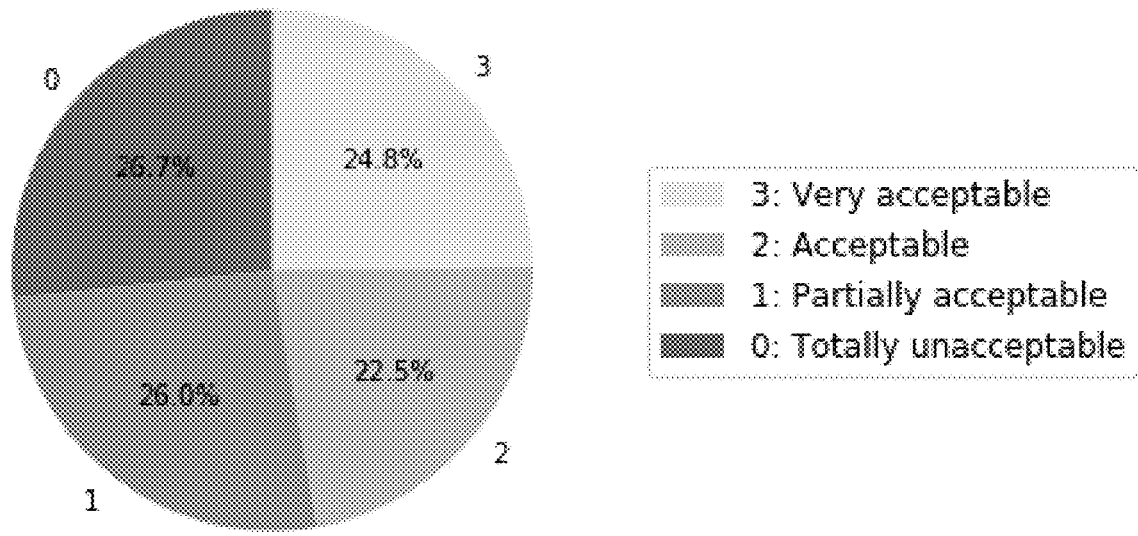
FIG. 7 shows experiment results.

The four-level evaluation used 29 sound sources as test data and adopted a form where 41 subjects answered for all the test data. FIG. 7 shows the results. The mean value was 1.45 and the variance was 1.28. This shows that sentences generated with the SCG acquired evaluations higher than "partially acceptable" on average.

Figure 8:
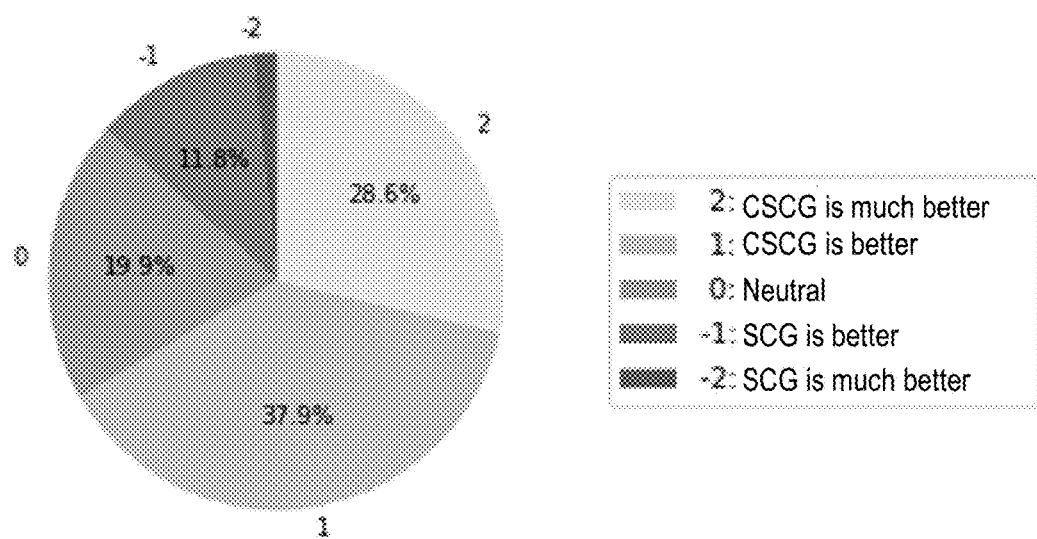
FIG. 8 shows experiment results.

In the comparison and evaluation, sentences generated with the CSCG under the four conditions of c=20, 50, 80, 100 and sentences generated with the SCG were compared and evaluated and answers that gave the highest evaluation to the CSCG among the four levels of comparison and evaluation were selected and aggregated. FIG. 8 shows the result. The result is for the answers of 19 subjects with 100 sound sources as test data, where the CSCG acquired an evaluation significantly higher than that for the SCG with a significance level of 1%. The mean value was 0.80 and the variance was 1.07.

<<Variations of Specificity>>

Specificity is an auxiliary input for controlling the nature (specifically, information content) of a sentence to be generated. The specificity may be a single numerical value (a scalar value) or a set of numerical values (a vector) as long as it can control the nature of a sentence to be generated. The followings are several examples of the same.

(Example 1) an Approach Based on the Frequency of Appearance of a Word N-Gram, which is a Sequence of N Words This approach uses the frequency of appearance of a sequence of words instead of the frequency of appearance of a single word. This approach may be able to control the nature of a sentence to be generated more appropriately because it can take an order of words into consideration. As with the probability of appearance of a word, the probability of appearance of a word N-gram can be calculated using a descriptive sentence database. Instead of a descriptive sentence database, any other available corpus may be used.

(Example 2) an Approach Based on the Number of Words

This approach uses the number of words contained in a sentence as specificity. Instead of the number of words, the number of characters may be used.

(Example 3) an Approach Using a Vector

For example, a three-dimensional vector with a set of the probability of appearance of a word, the probability of appearance of a word N-gram, and the number of words described above may be used as specificity. It is also possible to set categories (topics) for classification of words, such as politics, economics, and science, allocate a dimension to each category, and define specificity with a set of the probability of appearance of words in the respective categories as a vector. This would enable reflection of wordings that are specific to each category.

<<Application>>

The framework of learning of the SCG/CSCG and sentence generation with the SCG/CSCG can also be applied to more complicated sound like music or even media other than sound, aside from relatively simple sounds such as the sound sources illustrated in FIG. 5. Media other than sound can include images such as pictures, illustrations, or clip arts, and moving images. They may also be industrial designs or gustatory sense.

As with the SCG/CSCG, a model for associating such data with sentences corresponding to the data can be learned and the model can be used to generate a sentence. For example, for gustatory sense, it will be possible to generate a sentence as description/review about wine or agricultural produce by using a signal from a gustatory sensor as input. In that case, signals from an olfactory sensor, a tactile sensor, and a camera may be input together in addition to the gustatory sensor.

For handling of non-time-series data, the encoder and the decoder may be built with neural networks such as a convolutional neural network (CNN), for example.

First Embodiment

<<Data generation model learning apparatus 100>>

Figure 9:
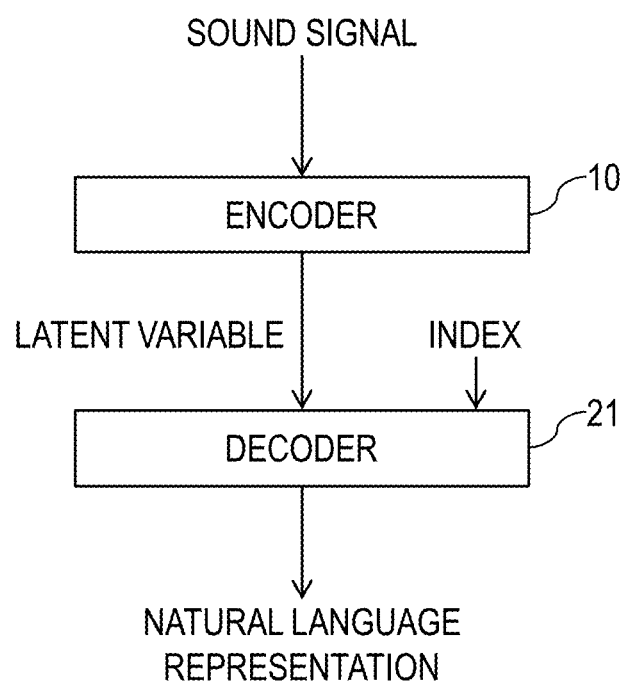
FIG. 9 shows an overview of a data generation model.

A data generation model learning apparatus 100 performs learning of a data generation model using learning data. The learning data includes the first learning data, which is pairs of sound signals and natural language representations corresponding to the sound signals, and the second learning data, which is pairs of indices for natural language representations and natural language representations corresponding to the indices. The data generation model refers to a function that takes as input a sound signal and a condition concerning an index for a natural language representation (for example, the specificity of a sentence) and generates and outputs a natural language representation corresponding to the sound signal. The data generation model is constructed as a pair of an encoder 10 for generating, from a sound signal, a latent variable corresponding to the sound signal and a decoder 21 for generating a natural language representation corresponding to the sound signal from the latent variable and the condition concerning an index for the natural language representation (see FIG. 9). A condition concerning an index for a natural language representation means an index required for the natural language representation to be generated, and the required index may be designated with a single numerical value or with a range. The encoder 10 and the decoder 21 can be any kind of neural networks that can process time-series data. Examples of natural language representations include phrases made up of two or more words without a subject and a predicate and onomatopoeia, aside from sentences as described in <Technical background>.

Figure 10:
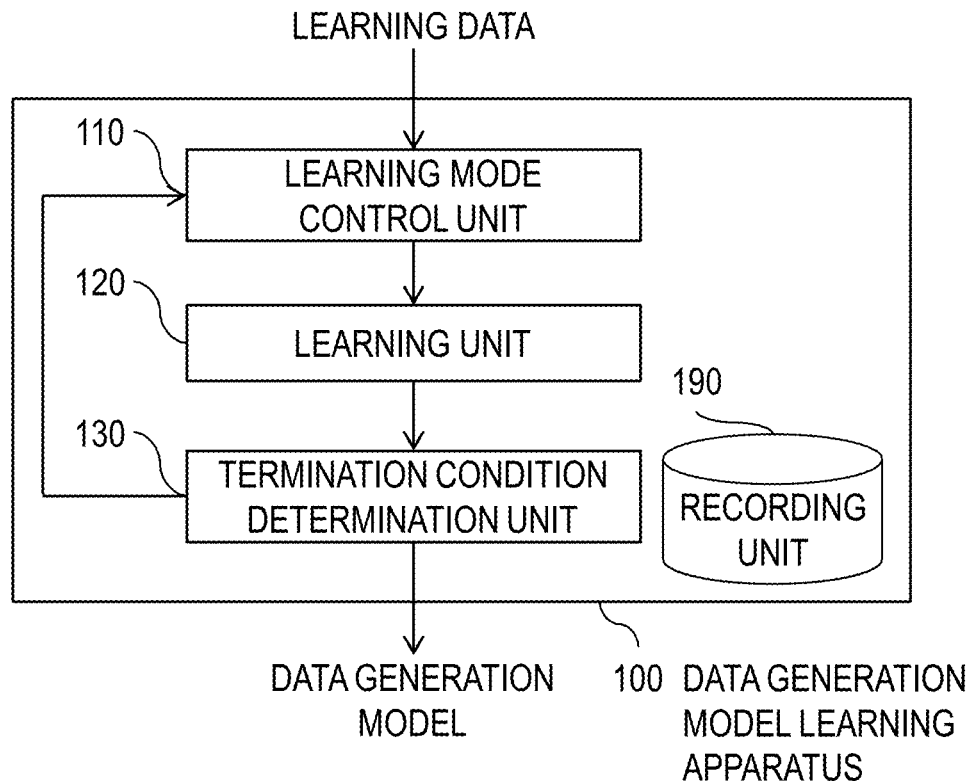
FIG. 10 is a block diagram showing a configuration of a data generation model learning apparatus 100.
Figure 11:
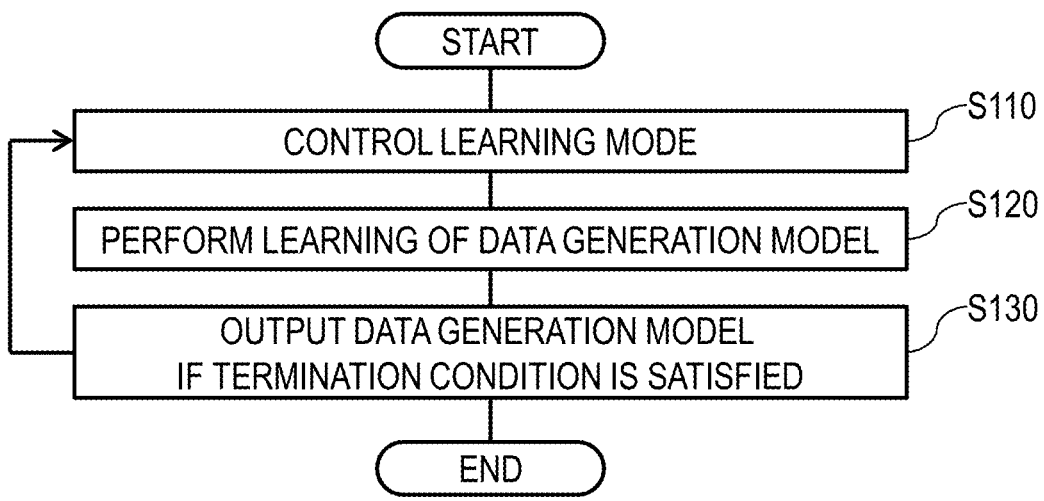
FIG. 11 is a flowchart illustrating operations of the data generation model learning apparatus 100.

Now referring to FIGS. 10 and 11, the data generation model learning apparatus 100 is described. FIG. 10 is a block diagram showing a configuration of the data generation model learning apparatus 100. FIG. 11 is a flowchart illustrating operations of the data generation model learning apparatus 100. As shown in FIG. 10, the data generation model learning apparatus 100 includes a learning mode control unit 110, a learning unit 120, a termination condition determination unit 130, and a recording unit 190. The recording unit 190 is a component that records information necessary for processing by the data generation model learning apparatus 100 as desired. The recording unit 190 records learning data therein before learning is started, for example.

In accordance with FIG. 11, operation of the data generation model learning apparatus 100 is described. The data generation model learning apparatus 100 takes as input the first learning data, an index for a natural language representation as an element of the first learning data, and the second learning data, and outputs a data generation model. An index for a natural language representation as an element of the first learning data may also be determined by the learning unit 120 from a natural language representation as an element of the first learning data, instead of being input.

In S110, the learning mode control unit 110 takes as input the first learning data, an index for a natural language representation as an element of the first learning data, and the second learning data, and generates and outputs a control signal for controlling the learning unit 120. Here, the control signal is a signal to control learning mode so that either of the first learning and the second learning is executed. The control signal can be a signal to control the learning mode so that the first learning and the second learning are alternately executed, for example. The control signal can also be a signal to control the learning mode so as to execute the first learning and the second learning such that the two types of learning are mixed in a certain manner, for example. In that case, the number of times the first learning is executed and the number of times the second learning is executed may be different values.

In S120, the learning unit 120 takes as input the first learning data, an index for a natural language representation as an element of the first learning data, the second learning data, and the control signal that was output in S110. When the learning designated by the control signal is the first learning, the learning unit 120 uses the first learning data and the index for a natural language representation as an element of the first learning data to perform learning of an encoder for generating a latent variable corresponding to a sound signal from the sound signal and a decoder for generating a natural language representation corresponding to the sound signal from the latent variable and a condition concerning an index for a natural language representation. When the learning designated by the control signal is the second learning, the learning unit 120 uses the second learning data to perform learning of the decoder. And the learning unit 120 outputs a data generation model which is a pair of the encoder and the decoder, with information necessary for the termination condition determination unit 130 to make a determination on a termination condition (for example, the number of times learning has been performed). The learning unit 120 executes learning in units of epoch regardless of whether the learning being executed is the first learning or the second learning. The learning unit 120 also performs learning of the data generation model by error backpropagation with the error function $L_{CSCG}$. The error function $L_{CSCG}$ is defined by the formula below when the learning to be executed is the first learning, where $\lambda$ is a predetermined constant.

$$L_{CSCG} = L_{SCG} + \lambda L_{sp}$$

When the learning to be executed is the second learning, it is defined by the formula below, where $\lambda'$ is a constant that satisfies $\lambda' < 1$.

$$L_{CSCG} = \lambda' L_{SCG} + \lambda L_{sp}$$

Here, the error $L_{SCG}$ related to a natural language representation is, when the learning to be executed is the first learning, a cross-entropy calculated from a natural language representation which is the output of the data generation model for a sound signal as an element of the first learning data and a natural language representation as an element of the first learning data, and is, when the learning to be executed is the second learning, a cross-entropy calculated from a natural language representation which is the output of the decoder for the index as an element of the second learning data and a natural language representation as an element of the second learning data.

The error function $L_{CSCG}$ may be any function that is defined with the two errors, $L_{SCG}$ and $L_{sp}$.

When a natural language representation is a sentence, the specificity of the sentence can be used as an index for a natural language representation as discussed in <Technical background>. In this case, the specificity of the sentence is defined with at least one of the probability of appearance of a word or the probability of appearance of a word N-gram that is contained in the sentence defined using at least a predetermined word database, the number of words contained in the sentence, and the number of characters contained in the sentence. For example, the specificity of a sentence may be defined by the formula below, where $I_s$ is the specificity of a sentence s which is a sequence of n words $[w_1, w_2, \ldots, w_n]$.

$$I_s = \sum_{t=1}^{n} I_{w_t}$$

(Here, $I_{w\_t}$ is the information content of the word $w_t$, which is determined based on the probability of appearance $p_{w\_t}$ of the word $w_t$.)

The specificity $I_s$ may be anything that is defined with the information content $I_{w\_t}$ ($1 \le t \le n$).

The word database can be any kind of database that allows definition of the probability of appearance of a word contained in sentences or the probability of appearance of a word N-gram contained in sentences. The word database can be the descriptive sentence database described in <Technical background>, for example.

The estimated specificity $\hat{I}_s$ of the sentence s as the output of the decoder is defined as:

$$\hat{I}_s = \sum_{t} E(I_{w_{t,j}})$$

$$E(I_{w_{t,j}}) = \sum_{j} I_{w_{t,j}} p(w_{t,j})$$

(where, the value $p(w_{t,j})$ of the unit j of the output layer of the decoder at time t is the probability of generation of the word $w_{t,j}$ corresponding to the unit j, and $I_{w\_t,j}$ is the information content of the word $w_{t,j}$, which is determined based on the probability of generation $p_{w\_t,j}$ of the word $w_{t,j}$), and the error $L_{sp}$ related to the specificity of the sentence is, when the learning to be executed is the first learning, the difference between the estimated specificity $\hat{I}_s$ and the specificity of a sentence as an element of the first learning data, and is, when the learning to be executed is the second learning, the difference between the estimated specificity $\hat{I}_s$ and specificity as an element of the second learning data.

For a phrase, specificity can also be defined as with a sentence.

In S130, the termination condition determination unit 130 takes as input the data generation model that was output at S120 and information necessary for determining the termination condition that was output at S120 and determines whether the termination condition, which is a condition concerning termination of learning, is satisfied or not (for example, the number of times learning has been performed has reached a predetermined number of iterations). If the termination condition is satisfied, the termination condition determination unit 130 outputs the data generation model and ends the processing. On the other hand, if the termination condition is not satisfied, it returns to the processing of S110.

This embodiment of the present invention enables learning of a data generation model for generating a natural language representation corresponding to a sound signal from the sound signal, using an index for a natural language representation as auxiliary input.

Second Embodiment

Herein, a language such as Japanese, English, and French will be represented as language $L_i$ (i=1, 2, . . . , N, where N is an integer equal to or greater than 2). It is assumed that if i≠j, $L_i \ne L_j$ holds, meaning that language $L_1$ and language $L_2$ are different languages from each other.

For the following description, N=2 is assumed.

<<Data generation model learning apparatus 200>>

Figure 12:
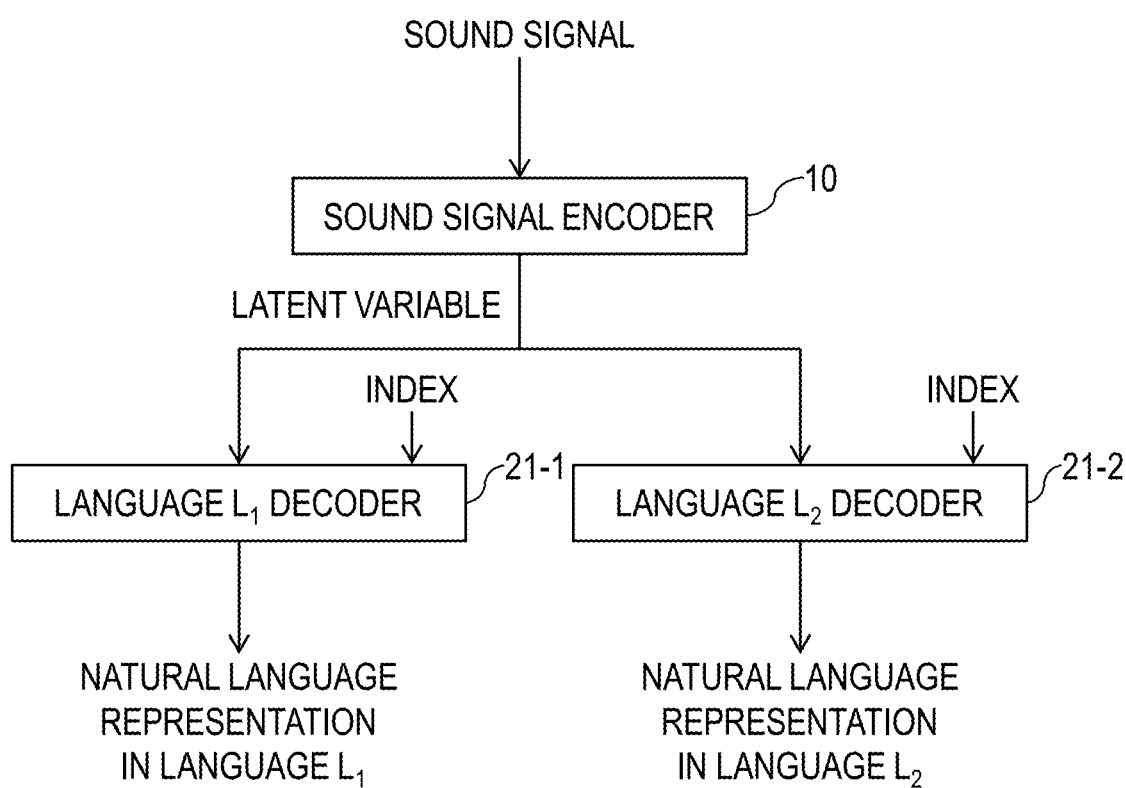
FIG. 12 shows an overview of a language $L_1$ generation model (i=1, 2).

A data generation model learning apparatus 200 performs learning of a language $L_i$ generation model (i=1, 2) using learning data. The learning data includes first learning data, which is sets of sound signals, natural language representations in the language $L_1$ corresponding to the sound signals, and natural language representations in the language $L_2$ corresponding to the sound signals, and second learning data, which is pairs of indices for natural language representations and natural language representations in the language $L_i$ (i=1, 2) corresponding to the indices. A natural language representation in the language $L_1$ and a natural language representation in the language $L_2$ that correspond to one sound signal are in a relationship of mutual translations. The language $L_1$ generation model (i=1, 2) refers to a function that takes as input a sound signal and a condition concerning an index for a natural language representation and generates and outputs a natural language representation in the language $L_i$ corresponding to the sound signal, and is a pair of a sound signal encoder 10 for generating, from a sound signal, a latent variable corresponding to the sound signal and a language $L_i$ decoder 21-i for generating a natural language representation in the language $L_i$ corresponding to the sound signal from the latent variable and the condition concerning an index for the natural language representation (see FIG. 12). A condition concerning an index for a natural language representation means an index required for the natural language representation to be generated, and the required index may be designated with a single numerical value or with a range. The sound signal encoder 10 and the language $L_i$ decoder 21-i can be any kind of neural networks that can process time-series data.

Figure 13:
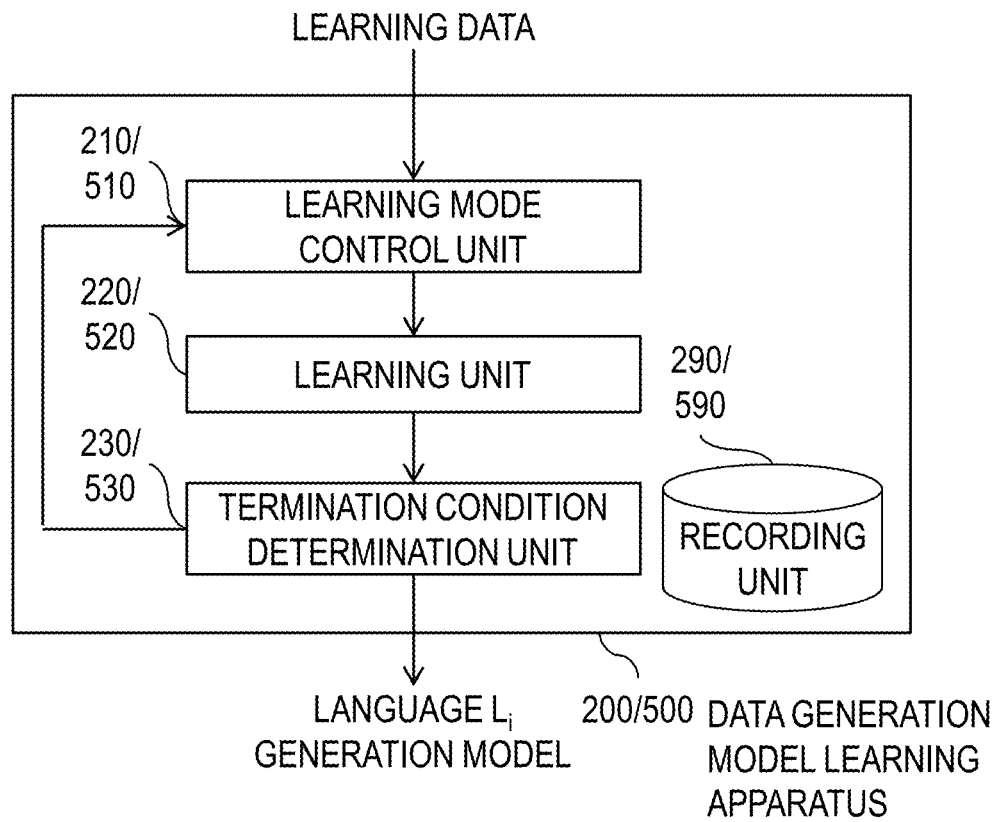
FIG. 13 is a block diagram showing a configuration of a data generation model learning apparatus 200/500.
Figure 14:
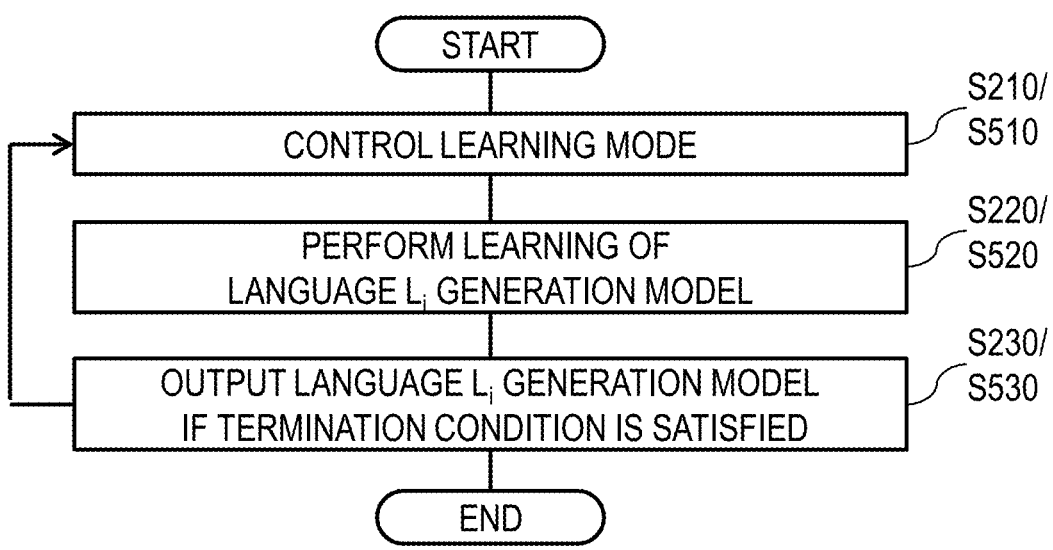
FIG. 14 is a flowchart illustrating operations of the data generation model learning apparatus 200/500.

Now referring to FIGS. 13 and 14, the data generation model learning apparatus 200 is described. FIG. 13 is a block diagram showing a configuration of the data generation model learning apparatus 200. FIG. 14 is a flowchart illustrating operations of the data generation model learning apparatus 200. As shown in FIG. 13, the data generation model learning apparatus 200 includes a learning mode control unit 210, a learning unit 220, a termination condition determination unit 230, and a recording unit 290. The recording unit 290 is a component that records information necessary for processing by the data generation model learning apparatus 200 as desired. The recording unit 290 records learning data therein before learning is started, for example.

In accordance with FIG. 14, operation of the data generation model learning apparatus 200 is described. The data generation model learning apparatus 200 takes as input the first learning data, an index for a natural language representation in the language $L_i$ (i=1, 2) as an element of the first learning data, and the second learning data, and outputs the language $L_i$ generation model (i=1, 2). An index for a natural language representation in the language $L_i$ (i=1, 2) as an element of the first learning data may also be determined by the learning unit 220 from a natural language representation in the language $L_i$ (i=1, 2) as an element of the first learning data, instead of being input.

In S210, the learning mode control unit 210 takes as input the first learning data, an index for a natural language representation in the language $L_i$ (i=1, 2) as an element of the first learning data, and the second learning data, and generates and outputs a control signal for controlling the learning unit 220. Here, the control signal is a signal to control learning mode so that either of the first learning and the second learning is executed. The control signal can be a signal to control the learning mode so that the first learning and the second learning are alternately executed, for example. The control signal can also be a signal to control the learning mode so as to execute the first learning and the second learning such that the two types of learning are mixed in a certain manner, for example. In that case, the number of times the first learning is executed and the number of times the second learning is executed may be different values.

In S220, the learning unit 220 takes as input the first learning data, the index for a natural language representation in the language $L_i$ (i=1, 2) as an element of the first learning data, the second learning data, and the control signal that was output in S210. When the learning designated by the control signal is the first learning, the learning unit 220 uses the first learning data and the index for a natural language representation in the language $L_i$ (i=1, 2) as an element of the first learning data to perform learning of a sound signal encoder for generating a latent variable corresponding to a sound signal from the sound signal and a language $L_i$ decoder (i=1, 2) for generating a natural language representation in the language $L_i$ (i=1, 2) corresponding to the sound signal from the latent variable and a condition concerning an index for a natural language representation in the language $L_i$ (i=1, 2). When the learning designated by the control signal is the second learning, the learning unit 220 uses the second learning data to perform learning of the language $L_i$ decoder (i=1, 2). And the learning unit 220 outputs the language $L_i$ generation model (i=1, 2) which is a pair of the sound signal encoder and the language $L_i$ decoder (i=1, 2), with information necessary for the termination condition determination unit 230 to make a determination on the termination condition (for example, the number of times learning has been performed). The learning unit 220 executes learning in units of epoch regardless of whether the learning being executed is the first learning or the second learning. The learning unit 220 also performs learning of the language $L_i$ generation model (i=1, 2) by error backpropagation with an error function $L_{CSCG}^{(i)}$=1, 2), defined in a similar manner to the error function $L_{CSCG}$ used with the data generation model learning apparatus 100. Here, the error function $L_{CSCG}^{(i)}$ is an error function for use in the learning of the language $L_i$ generation model.

In S230, the termination condition determination unit 230 takes as input the language $L_i$ generation model (i=1, 2) that was output at S220 and information necessary for determining the termination condition that was output at S220 and determines whether the termination condition, which is a condition concerning termination of learning, is satisfied or not (for example, the number of times learning has been performed has reached a predetermined number of iterations). If the termination condition is satisfied, the termination condition determination unit 230 outputs the language $L_i$ generation model (i=1, 2) and ends the processing. On the other hand, if the termination condition is not satisfied, it returns to the processing of S210.

<<Data Generation Model Learning Apparatus 250>>

A data generation model learning apparatus 250 performs learning of a language $L_i$ generation model (i=1, 2) using learning data. The data generation model learning apparatus 250 is different from the data generation model learning apparatus 200 in that it executes only the first learning using the first learning data.

Figure 15:
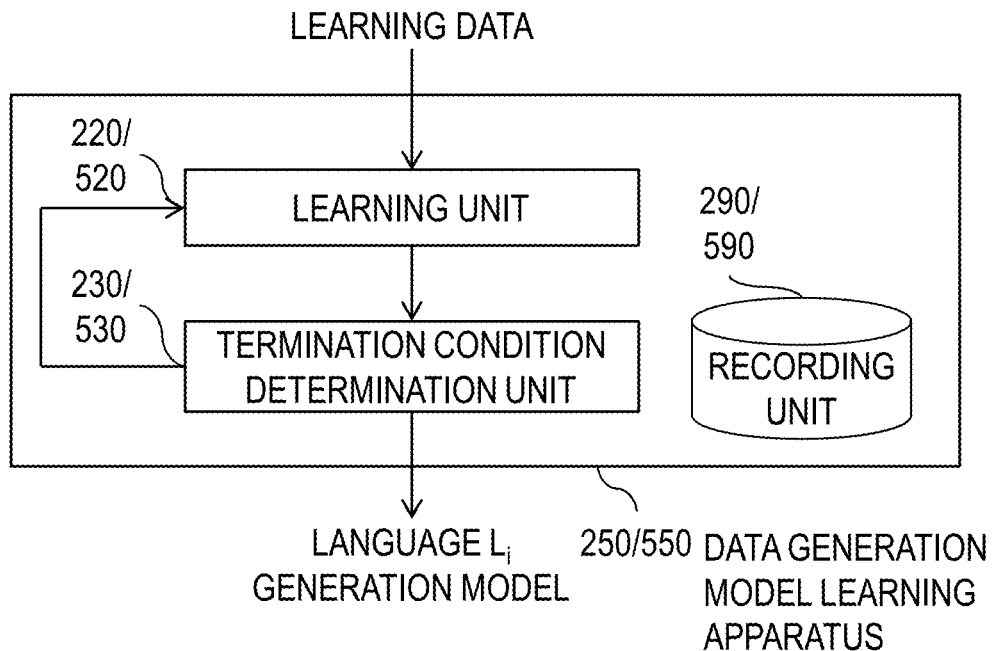
FIG. 15 is a block diagram showing a configuration of a data generation model learning apparatus 250/550.
Figure 16:
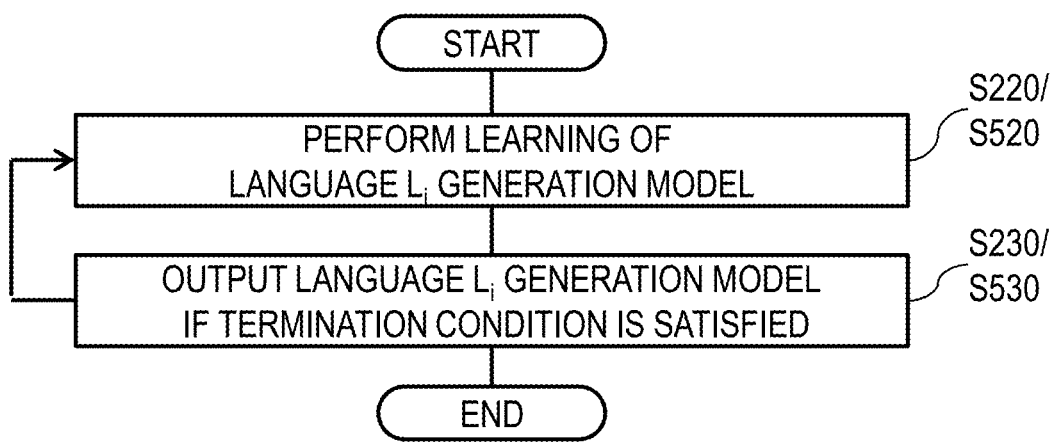
FIG. 16 is a flowchart illustrating operations of the data generation model learning apparatus 250/550.

Now referring to FIGS. 15 and 16, the data generation model learning apparatus 250 is described. FIG. 15 is a block diagram showing a configuration of the data generation model learning apparatus 250. FIG. 16 is a flowchart illustrating operations of the data generation model learning apparatus 250. As shown in FIG. 15, the data generation model learning apparatus 250 includes the learning unit 220, the termination condition determination unit 230, and the recording unit 290. The recording unit 290 is a component that records information necessary for processing by the data generation model learning apparatus 250 as desired.

In accordance with FIG. 16, operation of the data generation model learning apparatus 250 is described. The data generation model learning apparatus 250 takes as input the first learning data and an index for a natural language representation in the language $L_i$ (i=1, 2) as an element of the first learning data, and outputs the language $L_i$ generation model (i=1, 2). An index for a natural language representation in the language $L_i$ (i=1, 2) as an element of the first learning data may also be determined by the learning unit 220 from a natural language representation in the language $L_i$ (i=1, 2) as an element of the first learning data, instead of being input.

In S220, the learning unit 220 takes as input the first learning data and an index for a natural language representation in the language $L_i$ (i=1, 2) as an element of the first learning data, performs learning of the sound signal encoder and the language $L_i$ decoder (i=1, 2) using the first learning data and the index for a natural language representation in the language $L_i$ (i=1, 2) as an element of the first learning data, and outputs the language $L_i$ generation model (i=1, 2) which is a pair of the sound signal encoder and the language $L_i$ decoder (i=1, 2), with information necessary for the termination condition determination unit 230 to make a determination on the termination condition (for example, the number of times learning has been performed). The learning unit 220 executes learning in units of epoch, for example. The learning unit 220 also performs learning of the language $L_i$ generation model by error backpropagation with the error function $L_{CSCG}^{(i)}$.

In S230, the termination condition determination unit 230 takes as input the language $L_i$ generation model (i=1, 2) that was output at S220 and information necessary for determining the termination condition that was output at S220 and determines whether the termination condition, which is a condition concerning termination of learning, is satisfied or not (for example, the number of times learning has been performed has reached a predetermined number of iterations). If the termination condition is satisfied, the termination condition determination unit 230 outputs the language $L_i$ generation model (i=1, 2) and ends the processing. On the other hand, if the termination condition is not satisfied, it returns to the processing of S220.

<<Latent Variable Generation Model Learning Apparatus 300>>

A latent variable generation model learning apparatus 300 performs learning of a latent variable generation model using learning data. The learning data is pairs of natural language representations in the language $L_i$ (i=1, 2) corresponding to sound signals and latent variables corresponding to the sound signals, the natural language representations and the latent variables being generated from the sound signals using the language $L_i$ generation model (i=1, 2) learned with the data generation model learning apparatus 200 or the data generation model learning apparatus 250 (hereinafter referred to as supervised learning data). The latent variable generation model is a language $L_i$ encoder (i=1, 2) that generates a latent variable corresponding to a natural language representation in the language $L_i$ (i=1, 2) from the natural language representation in the language $L_i$ (i=1, 2). The language $L_i$ encoder can be any kind of neural network that can process time-series data.

Figure 17:
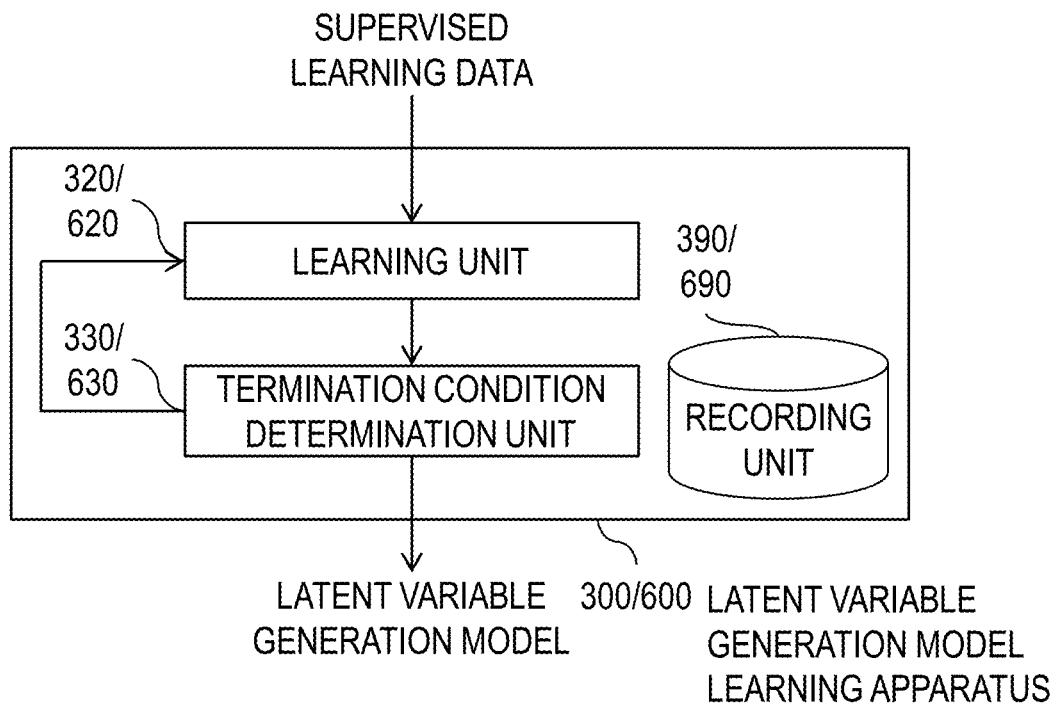
FIG. 17 is a block diagram showing a configuration of a latent variable generation model learning apparatus 300/600.
Figure 18:
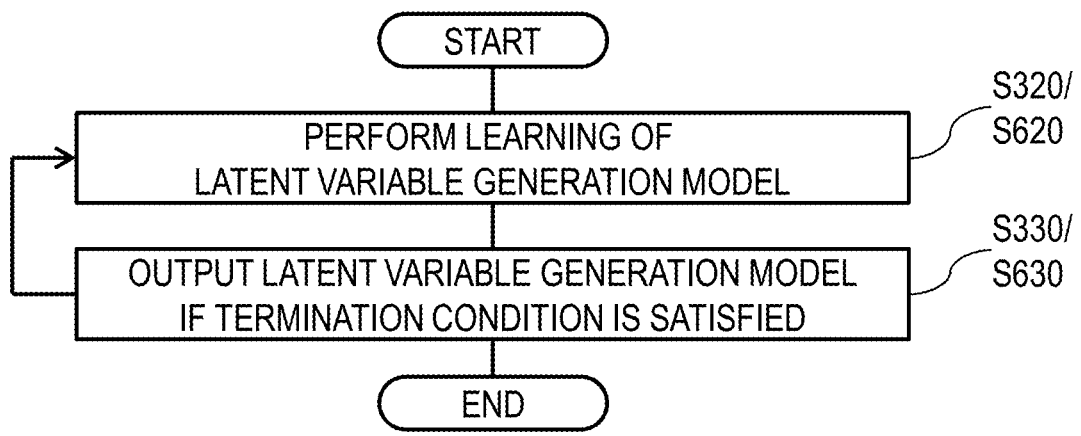
FIG. 18 is a flowchart illustrating operations of the latent variable generation model learning apparatus 300/600.

Now referring to FIGS. 17 and 18, the latent variable generation model learning apparatus 300 is described. FIG. 17 is a block diagram showing a configuration of the latent variable generation model learning apparatus 300. FIG. 18 is a flowchart illustrating operations of the latent variable generation model learning apparatus 300. As shown in FIG. 17, the latent variable generation model learning apparatus 300 includes a learning unit 320, a termination condition determination unit 330, and a recording unit 390. The recording unit 390 is a component that records information necessary for processing by the latent variable generation model learning apparatus 300 as desired. The recording unit 390 records supervised learning data therein before learning is started, for example.

In accordance with FIG. 18, operation of the latent variable generation model learning apparatus 300 is described. The latent variable generation model learning apparatus 300 takes supervised learning data as input and outputs a latent variable generation model. The input supervised learning data is recorded in the recording unit 390, for example, as mentioned above.

In S320, the learning unit 320 takes as input the supervised learning data recorded in the recording unit 390, performs learning of the language $L_i$ encoder (i=1, 2), as a latent variable generation model, for generating a latent variable corresponding to a natural language representation in the language $L_i$ (i=1, 2) from the natural language representation in the language $L_i$ through supervised learning with the supervised learning data, and outputs the language $L_i$ encoder (i=1, 2) with information necessary for the termination condition determination unit 330 to make a determination on the termination condition (for example, the number of times learning has been performed). The learning unit 320 executes learning in units of epoch, for example. The learning unit 320 also performs learning of the language $L_i$ encoder (i=1, 2) as the latent variable generation model by error backpropagation with a predetermined error function $L^{(i)}$.

In S330, the termination condition determination unit 330 takes as input the language $L_i$ encoder (i=1, 2) that was output in S320 and the information necessary for determination on the termination condition that was output in S320, and determines whether the termination condition, which is a condition concerning termination of learning, is satisfied or not (for example, whether the number of times learning has been performed has reached a predetermined number of iterations). If the termination condition is satisfied, the termination condition determination unit 330 outputs the latent variable generation model (that is, the pair of the language $L_1$ encoder and the language $L_2$ encoder) and ends the processing. On the other hand, if the termination condition is not satisfied, it returns to the processing of S320.

<<Translation Data Generation Apparatus 400>>

A translation data generation apparatus 400 generates a natural language representation in the language $L_2$ from a natural language representation in the language $L_1$ using the language $L_1$ encoder learned with the latent variable generation model learning apparatus 300 and the language $L_2$ decoder learned with the data generation model learning apparatus 200 or the data generation model learning apparatus 250. That is, the translation data generation apparatus 400 translates a natural language representation in the language $L_1$ to a natural language representation in the language $L_2$. A language $L_1$ encoder learned with the latent variable generation model learning apparatus 300 is also referred to as a learned language $L_1$ encoder. A language $L_2$ decoder learned with the data generation model learning apparatus 200 or the data generation model learning apparatus 250 is also referred to as a learned language $L_2$ decoder. It is of course possible to use a language $L_1$ encoder learned with a latent variable generation model learning apparatus other than the latent variable generation model learning apparatus 300 or a language $L_2$ decoder learned with a data generation model learning apparatus other than the data generation model learning apparatus 200 and the data generation model learning apparatus 250.

Figure 19:
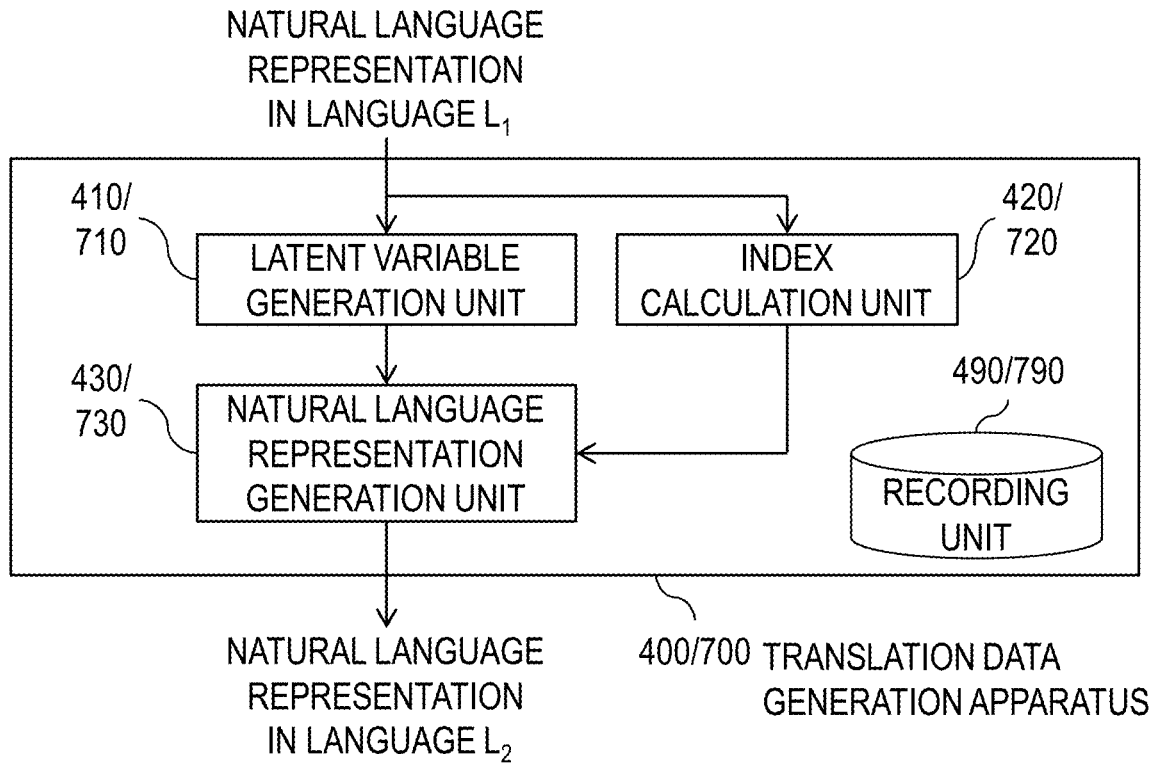
FIG. 19 is a block diagram showing a configuration of a translation data generation apparatus 400/700.
Figure 20:
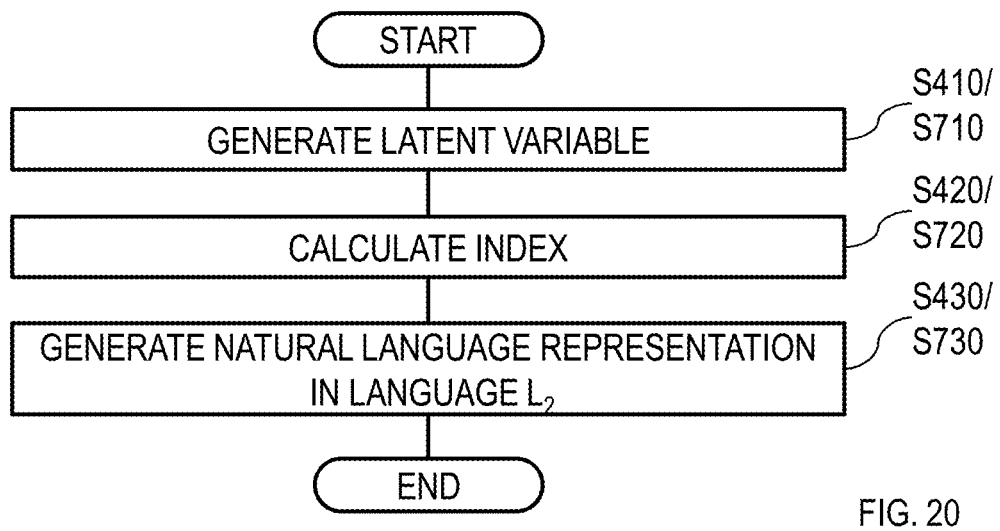
FIG. 20 is a flowchart illustrating operations of the translation data generation apparatus 400/700.

Now referring to FIGS. 19 and 20, the translation data generation apparatus 400 is described. FIG. 19 is a block diagram showing a configuration of the translation data generation apparatus 400. FIG. 20 is a flowchart illustrating operations of the translation data generation apparatus 400. As shown in FIG. 19, the translation data generation apparatus 400 includes a latent variable generation unit 410, an index calculation unit 420, a natural language representation generation unit 430, and a recording unit 490. The recording unit 490 is a component that records information necessary for processing by the translation data generation apparatus 400 as desired. The recording unit 490 records the learned language $L_1$ encoder and the learned language $L_2$ decoder therein beforehand, for example.

In accordance with FIG. 20, operation of the translation data generation apparatus 400 is described. The translation data generation apparatus 400 takes a natural language representation in the language $L_1$ as input and outputs a natural language representation in the language $L_2$.

In S410, the latent variable generation unit 410 takes a natural language representation in the language $L_1$ as input, generates a latent variable corresponding to the natural language representation in the language $L_1$ from the natural language representation in the language $L_1$ using the language $L_1$ encoder, and outputs it.

In S420, the index calculation unit 420 takes the natural language representation in the language $L_1$ as input, calculates an index for the natural language representation in the language $L_1$ from the natural language representation in the language $L_1$, and outputs it. An index for a natural language representation may be the one described in the first embodiment.

In S430, the natural language representation generation unit 430 takes as input the latent variable that was output in S410 and the index for the natural language representation in the language $L_1$ that was output in S420, generates a natural language representation in the language $L_2$ corresponding to the natural language representation in the language $L_1$ from the latent variable and the index for the natural language representation in the language $L_1$ using the language $L_2$ decoder, and outputs it.

The foregoing discussion also holds when N is an integer equal to or greater than 3. Therefore, by using the language $L_i$ encoder and the language $L_j$ decoder (where i≠j), a translation data generation apparatus for generating a natural language representation in a language $L_j$ from a natural language representation in the language $L_i$ can be built. This enables translation between any languages.

This embodiment of the present invention enables learning of the language $L_i$ generation model for generating a natural language representation in the language $L_i$ corresponding to a sound signal from the sound signal, using an index for the natural language representation as auxiliary input. This embodiment of the present invention enables learning of the language $L_i$ encoder for generating a latent variable corresponding to a natural language representation in the language $L_i$ from the natural language representation in the language $L_i$. This embodiment of the present invention enables accurate translation using sound.

<Modification>

While the data generation model learning apparatus 200, the data generation model learning apparatus 250, the latent variable generation model learning apparatus 300, and the translation data generation apparatus 400 use sound signals, images may be used instead of sound signals, for example. Furthermore, a translation data generation apparatus can be built using signals acquired with sensors corresponding to the five senses of the human being, namely, auditory sense, visual sense, gustatory sense, olfactory sense, and tactile sense (hereinafter referred to as signals based on sensory information).

In the following, a data generation model learning apparatus, a latent variable generation model learning apparatus, and a translation data generation apparatus that use signals based on sensory information are described.

<<Data Generation Model Learning Apparatus 500>>

A data generation model learning apparatus 500 performs learning of a language $L_i$ generation model (i=1, 2) using learning data. The learning data includes the first learning data, which is sets of signals based on sensory information, natural language representations in the language $L_1$ corresponding to the signals, and natural language representations in the language $L_2$ corresponding to the signals, and the second learning data, which is pairs of indices for natural language representations and natural language representations in the language $L_i$ (i=1, 2) corresponding to the indices. A natural language representation in the language $L_1$ and a natural language representation in the language $L_2$ that correspond to one signal based on sensory information are in a relationship of mutual translations. The language $L_i$ generation model (i=1, 2) refers to a function that takes as input a signal based on sensory information and a condition concerning an index for a natural language representation and generates and outputs a natural language representation in the language $L_i$ corresponding to the signal, and is a pair of a signal encoder for generating, from a signal based on sensory information, a latent variable corresponding to the signal based on sensory information and a language $L_i$ decoder for generating a natural language representation in the language $L_i$ corresponding to the signal based on sensory information from the latent variable and the condition concerning an index for the natural language representation. The signal encoder and the language $L_i$ decoder can be any kind of neural networks that can process signals based on sensory information.

Now referring to FIGS. 13 and 14, the data generation model learning apparatus 500 is described. FIG. 13 is a block diagram showing a configuration of the data generation model learning apparatus 500. FIG. 14 is a flowchart illustrating operations of the data generation model learning apparatus 500. As shown in FIG. 13, the data generation model learning apparatus 500 includes a learning mode control unit 510, a learning unit 520, a termination condition determination unit 530, and a recording unit 590. The recording unit 590 is a component that records information necessary for processing by the data generation model learning apparatus 500 as desired. The recording unit 590 records learning data therein before learning is started, for example.

In accordance with FIG. 14, operation of the data generation model learning apparatus 500 is described. The data generation model learning apparatus 500 takes as input the first learning data, an index for a natural language representation in the language $L_i$ (i=1, 2) as an element of the first learning data, and the second learning data, and outputs the language $L_i$ generation model (i=1, 2). An index for a natural language representation in the language $L_i$ (i=1, 2) as an element of the first learning data may also be determined by the learning unit 520 from a natural language representation in the language $L_i$ (i=1, 2) as an element of the first learning data, instead of being input.

In S510, the learning mode control unit 510 takes as input the first learning data, an index for a natural language representation in the language $L_i$ (i=1, 2) as an element of the first learning data, and the second learning data, and generates and outputs a control signal for controlling the learning unit 520.

In S520, the learning unit 520 takes as input the first learning data, an index for a natural language representation in the language $L_i$ (i=1, 2) as an element of the first learning data, the second learning data, and the control signal that was output in S510. When the learning designated by the control signal is the first learning, the learning unit 520 uses the first learning data and the index for a natural language representation in the language $L_i$ (i=1, 2) as an element of the first learning data to perform learning of a signal encoder for generating a latent variable corresponding to a signal based on sensory information from the signal based on sensory information and a language $L_i$ decoder (i=1, 2) for generating a natural language representation in the language $L_i$ (i=1, 2) corresponding to the signal based on sensory information from the latent variable and a condition concerning an index for a natural language representation in the language $L_i$ (i=1, 2). When the learning designated by the control signal is the second learning, the learning unit 520 uses the second learning data to perform learning of the language $L_i$ decoder (i=1, 2). And the learning unit 520 outputs the language $L_i$ generation model (i=1, 2) which is a pair of the signal encoder and the language $L_i$ decoder (i=1, 2), with information necessary for the termination condition determination unit 530 to make a determination on the termination condition (for example, the number of times learning has been performed).

In S530, the termination condition determination unit 530 takes as input the language $L_i$ generation model (i=1, 2) that was output at S520 and information necessary for determining the termination condition that was output at S520 and determines whether the termination condition, which is a condition concerning termination of learning, is satisfied or not (for example, the number of times learning has been performed has reached a predetermined number of iterations). If the termination condition is satisfied, the termination condition determination unit 530 outputs the language $L_i$ generation model (i=1, 2) and ends the processing. On the other hand, if the termination condition is not satisfied, it returns to the processing of S510.

<<Data Generation Model Learning Apparatus 550>>

A data generation model learning apparatus 550 performs learning of a language $L_i$ generation model (i=1, 2) using learning data. The data generation model learning apparatus 550 is different from the data generation model learning apparatus 500 in that it executes only the first learning using the first learning data.

Now referring to FIGS. 15 and 16, the data generation model learning apparatus 550 is described. FIG. 15 is a block diagram showing a configuration of the data generation model learning apparatus 550. FIG. 16 is a flowchart illustrating operations of the data generation model learning apparatus 550. As shown in FIG. 15, the data generation model learning apparatus 550 includes the learning unit 520, the termination condition determination unit 530, and the recording unit 590. The recording unit 590 is a component that records information necessary for processing by the data generation model learning apparatus 550 as desired.

In accordance with FIG. 16, operation of the data generation model learning apparatus 550 is described. The data generation model learning apparatus 550 takes as input the first learning data and an index for a natural language representation in the language $L_i$ (i=1, 2) as an element of the first learning data, and outputs the language $L_i$ generation model (i=1, 2). An index for a natural language representation in the language $L_i$ (i=1, 2) as an element of the first learning data may also be determined by the learning unit 520 from a natural language representation in the language $L_i$ (i=1, 2) as an element of the first learning data, instead of being input.

In S520, the learning unit 520 takes as input the first learning data and an index for a natural language representation in the language $L_i$ (i=1, 2) as an element of the first learning data, performs learning of the signal encoder and the language $L_i$ decoder (i=1, 2) using the first learning data and the index for a natural language representation in the language $L_i$ (i=1, 2) as an element of the first learning data, and outputs the language $L_i$ generation model (i=1, 2) which is a pair of the signal encoder and the language $L_i$ decoder (i=1, 2), with information necessary for the termination condition determination unit 530 to make a determination on the termination condition (for example, the number of times learning has been performed).

In S530, the termination condition determination unit 530 takes as input the language $L_i$ generation model (i=1, 2) that was output at S520 and information necessary for determining the termination condition that was output at S520 and determines whether the termination condition, which is a condition concerning termination of learning, is satisfied or not (for example, the number of times learning has been performed has reached a predetermined number of iterations). If the termination condition is satisfied, the termination condition determination unit 530 outputs the language $L_i$ generation model (i=1, 2) and ends the processing. On the other hand, if the termination condition is not satisfied, it returns to the processing of S520.

<<Latent Variable Generation Model Learning Apparatus 600>>

A latent variable generation model learning apparatus 600 performs learning of a latent variable generation model using learning data. The learning data is pairs of natural language representations in the language $L_i$ (i=1, 2) corresponding to signals based on sensory information and latent variables corresponding to the signals, the natural language representations and the latent variables being generated from the signals using the language $L_i$ generation model (i=1, 2) learned with the data generation model learning apparatus 500 or the data generation model learning apparatus 550 (hereinafter referred to as supervised learning data). The latent variable generation model is a language $L_i$ encoder (i=1, 2) that generates a latent variable corresponding to a natural language representation in the language $L_i$ (i=1, 2) from the natural language representation in the language $L_i$ (i=1, 2). The language $L_i$ encoder can be any kind of neural network that can process signals based on sensory information.

Now referring to FIGS. 17 and 18, the latent variable generation model learning apparatus 600 is described. FIG. 17 is a block diagram showing a configuration of the latent variable generation model learning apparatus 600. FIG. 18 is a flowchart illustrating operations of the latent variable generation model learning apparatus 600. As shown in FIG. 17, the latent variable generation model learning apparatus 600 includes a learning unit 620, a termination condition determination unit 630, and a recording unit 690. The recording unit 690 is a component that records information necessary for processing by the latent variable generation model learning apparatus 600 as desired. The recording unit 690 records supervised learning data therein before learning is started, for example.

In accordance with FIG. 18, operation of the latent variable generation model learning apparatus 600 is described. The latent variable generation model learning apparatus 600 takes supervised learning data as input and outputs a latent variable generation model. The input supervised learning data is recorded in the recording unit 690, for example, as mentioned above.

In S620, the learning unit 620 takes as input the supervised learning data recorded in the recording unit 690, performs learning of the language $L_i$ encoder (i=1, 2), as a latent variable generation model, for generating a latent variable corresponding to a natural language representation in the language $L_i$ (i=1, 2) from the natural language representation in the language $L_i$ through supervised learning with the supervised learning data, and outputs the language $L_i$ encoder (i=1, 2) with information necessary for the termination condition determination unit 630 to make a determination on the termination condition (for example, the number of times learning has been performed).

In S630, the termination condition determination unit 630 takes as input the language $L_i$ encoder (i=1, 2) that was output in S620 and the information necessary for determination on the termination condition that was output in S620, and determines whether the termination condition, which is a condition concerning termination of learning, is satisfied or not (for example, whether the number of times learning has been performed has reached a predetermined number of iterations). If the termination condition is satisfied, the termination condition determination unit 630 outputs the latent variable generation model (that is, the pair of the language $L_1$ encoder and the language $L_2$ encoder) and ends the processing. On the other hand, if the termination condition is not satisfied, it returns to the processing of S620.

<<Translation Data Generation Apparatus 700>>

A translation data generation apparatus 700 generates a natural language representation in the language $L_2$ from a natural language representation in the language $L_1$ using the language $L_1$ encoder learned with the latent variable generation model learning apparatus 600 and the language $L_2$ decoder learned with the data generation model learning apparatus 500 or the data generation model learning apparatus 550. That is, the translation data generation apparatus 700 translates a natural language representation in the language $L_1$ to a natural language representation in the language $L_2$. A language $L_1$ encoder learned with the latent variable generation model learning apparatus 600 is also referred to as a learned language $L_1$ encoder. A language $L_2$ decoder learned with the data generation model learning apparatus 500 or the data generation model learning apparatus 550 is also referred to as a learned language $L_2$ decoder. It is of course possible to use a language $L_1$ encoder learned with a latent variable generation model learning apparatus other than the latent variable generation model learning apparatus 600 or a language $L_2$ decoder learned with a data generation model learning apparatus other than the data generation model learning apparatus 500 and the data generation model learning apparatus 550.

Now referring to FIGS. 19 and 20, the translation data generation apparatus 700 is described. FIG. 19 is a block diagram showing a configuration of the translation data generation apparatus 700. FIG. 20 is a flowchart illustrating operations of the translation data generation apparatus 700. As shown in FIG. 19, the translation data generation apparatus 700 includes a latent variable generation unit 710, an index calculation unit 720, a natural language representation generation unit 730, and a recording unit 790. The recording unit 790 is a component that records information necessary for processing by the translation data generation apparatus 700 as desired. The recording unit 790 records the learned language $L_1$ encoder and the learned language $L_2$ decoder therein beforehand, for example.

In accordance with FIG. 20, operation of the translation data generation apparatus 700 is described. The translation data generation apparatus 700 takes a natural language representation in the language $L_1$ as input and outputs a natural language representation in the language $L_2$.

In S710, the latent variable generation unit 710 takes a natural language representation in the language $L_1$ as input, generates a latent variable corresponding to the natural language representation in the language $L_1$ from the natural language representation in the language $L_1$ using the language $L_1$ encoder, and outputs it.

In S720, the index calculation unit 720 takes the natural language representation in the language $L_1$ as input, calculates an index for the natural language representation in the language $L_1$ from the natural language representation in the language $L_1$, and outputs it.

In S730, the natural language representation generation unit 730 takes as input the latent variable that was output in S710 and the index for the natural language representation in the language $L_1$ that was output in S720, generates a natural language representation in the language $L_2$ corresponding to the natural language representation in the language $L_1$ from the latent variable and the index for the natural language representation in the language $L_1$ using the language $L_2$ decoder, and outputs it.

This embodiment of the present invention enables learning of a language $L_i$ generation model for generating a natural language representation in the language $L_i$ corresponding to a signal based on sensory information from the signal, using an index for a natural language representation as auxiliary input. This embodiment of the present invention enables learning of the language $L_i$ encoder for generating a latent variable corresponding to a natural language representation in the language $L_i$ from the natural language representation in the language $L_i$. This embodiment of the present invention enables accurate translation using signals based on sensory information.

Appendix

The apparatus according to the present invention has, as a single hardware entity, for example, an input unit to which a keyboard or the like is connectable, an output unit to which a liquid crystal display or the like is connectable, a communication unit to which a communication device (for example, communication cable) capable of communication with the outside of the hardware entity is connectable, a central processing unit (CPU, which may include cache memory and/or registers), RAM or ROM as memories, an external storage device which is a hard disk, and a bus that connects the input unit, the output unit, the communication unit, the CPU, the RAM, the ROM, and the external storage device so that data can be exchanged between them. The hardware entity may also include, for example, a device (drive) capable of reading and writing a recording medium such as a CD-ROM as desired. A physical entity having such hardware resources may be a general-purpose computer, for example.

The external storage device of the hardware entity has stored therein programs necessary for embodying the aforementioned functions and data necessary in the processing of the programs (in addition to the external storage device, the programs may be prestored in ROM as a storage device exclusively for reading out, for example). Also, data or the like resulting from the processing of these programs are stored in the RAM and the external storage device as appropriate.

In the hardware entity, the programs and data necessary for processing of the programs stored in the external storage device (or ROM and the like) are read into memory as necessary to be interpreted and executed/processed as appropriate by the CPU. As a consequence, the CPU embodies predetermined functions (the components represented above as units, means, or the like).

The present invention is not limited to the above embodiments, but modifications may be made within the scope of the present invention. Also, the processes described in the embodiments may be executed not only in a chronological sequence in accordance with the order of their description but may be executed in parallel or separately according to the processing capability of the apparatus executing the processing or any necessity.

As already mentioned, when the processing functions of the hardware entities described in the embodiments (the apparatus of the present invention) are to be embodied with a computer, the processing details of the functions to be provided by the hardware entities are described by a program. By the program then being executed on the computer, the processing functions of the hardware entity are embodied on the computer.

The program describing the processing details can be recorded on a computer-readable recording medium. The computer-readable recording medium may be any kind, such as a magnetic recording device, an optical disk, a magneto-optical recording medium, or a semiconductor memory. More specifically, a magnetic recording device may be a hard disk device, flexible disk, or magnetic tape; an optical disk may be a DVD (digital versatile disc), a DVD-RAM (random access memory), a CD-ROM (compact disc read only memory), or a CD-R (recordable)/RW (rewritable); a magneto-optical recording medium may be an MO (magneto-optical disc); and a semiconductor memory may be EEP-ROM (electronically erasable and programmable-read only memory), for example.

Also, the distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer then reads the program stored in the storage device thereof and executes the processing in accordance with the read program. Also, as another form of execution of this program, the computer may read the program directly from the portable recording medium and execute the processing in accordance with the program and, furthermore, every time the program is transferred to the computer from the server computer, the computer may sequentially execute the processing in accordance with the received program. Also, a configuration may be adopted in which the transfer of a program to the computer from the server computer is not performed and the above-described processing is executed by so-called application service provider (ASP)-type service by which the processing functions are implemented only by an instruction for execution thereof and result acquisition. Note that a program in this form shall encompass information that is used in processing by an electronic computer and acts like a program (such as data that is not a direct command to a computer but has properties prescribing computer processing).

Further, although the hardware entity was described as being configured via execution of a predetermined program on a computer in this form, at least some of these processing details may instead be embodied with hardware.

The foregoing description of the embodiments of the invention has been presented for the purpose of illustration and description. It is not intended to be exhaustive and to limit the invention to the precise form disclosed. Modifications or variations are possible in light of the above teaching. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A data generation model learning apparatus comprising:
processing circuitry configured to: execute
a learning processing that comprises training a language $L_i$ generation model (i=1, 2) using first learning data which is sets of sound signals, natural language representations in a language $L_1$ describing the sound signals, and natural language representations in a language $L_2$ describing the sound signals, an index for a natural language representation in the language $L_1$ as an element of the first learning data, and an index for a natural language representation in the language $L_2$ as an element of the first learning data, wherein the index for the natural language representation in the language $L_i$ (i=1, 2) indicates specificity of describing the sound signals, wherein
the language $L_i$ generation model (i=1, 2) is a pair of a sound signal encoder that generates, from a sound signal, a latent variable corresponding to the sound signal and a language $L_i$ decoder (i=1, 2) that generates a natural language representation in a language $L_i$ (i=1, 2) describing the sound signal from the latent variable and a condition concerning an index for a natural language representation in the language $L_i$ (i=1, 2), and the latent variable is a fixed-length vector.

2. A latent variable generation model learning apparatus comprising:
processing circuitry configured to: execute
a learning processing that comprises training a language $L_i$ encoder (i=1, 2) that generates, from a natural language representation in a language $L_i$ (i=1, 2), a latent variable corresponding to the natural language representation in the language $L_i$ as a latent variable generation model, the learning being performed through supervised learning using pairs of natural language representations in the language $L_i$ (i=1, 2) describing sound signals and latent variables corresponding to the sound signals as supervised learning data, the natural language representations and the latent variables being generated from the sound signals by a language $L_i$ generation model (i=1, 2) which is a pair of a sound signal encoder that generates, from a sound signal, a latent variable corresponding to the sound signal and a language $L_i$ decoder (i=1, 2) that generates a natural language representation in the language $L_i$ (i=1, 2) describing the sound signal from the latent variable and a condition concerning an index for a natural language representation in the language $L_i$ (i=1, 2)-, wherein the latent variable is a fixed-length vector, and the index for a natural language representation in the language $L_i$ (i=1, 2) indicates specificity of describing the sound signals.

3. A data generation model learning apparatus comprising:
processing circuitry configured to: execute
a learning processing that comprises training a language $L_i$ generation model (i=1, 2) using first learning data which is sets of signals based on sensory information, natural language representations in a language $L_1$ describing the signals, and natural language representations in a language $L_2$ describing the signals; an index for a natural language representation in the language $L_1$ as an element of the first learning data; and an index for a natural language representation in the language $L_2$ as an element of the first learning data, wherein the index for the natural language representation in the language $L_i$ (i=1, 2) indicates specificity of describing the signals, wherein
the language $L_i$ generation model (i=1, 2) is a pair of a signal encoder that generates, from a signal based on sensory information, a latent variable corresponding to the signal based on sensory information and a language $L_i$ decoder (i=1, 2) that generates a natural language representation in a language $L_i$ (i=1, 2) describing the signal based on sensory information from the latent variable and a condition concerning an index for a natural language representation in the language $L_i$ (i=1, 2), and the latent variable is a fixed-length vector.

4. A latent variable generation model learning apparatus comprising:
processing circuitry configured to: execute
a learning processing that comprises training a language $L_i$ encoder (i=1, 2) that generates, from a natural language representation in a language $L_i$ (i=1, 2), a latent variable corresponding to the natural language representation in the language $L_i$ as a latent variable generation model, the learning being performed through supervised learning using pairs of natural language representations in the language $L_i$ (i=1, 2) describing signals based on sensory information and latent variables corresponding to the signals as supervised learning data, the natural language representations and the latent variables being generated from the signals by a language $L_i$ generation model (i=1, 2) which is a pair of a signal encoder that generates, from a signal based on sensory information, a latent variable corresponding to the signal based on sensory information and a language $L_i$ decoder (i=1, 2) that generates a natural language representation in the language $L_i$ (i=1, 2) describing the signal based on sensory information from the latent variable and a condition concerning an index for a natural language representation in the language $L_i$ (i=1, 2), wherein the latent variable is a fixed-length vector, and the index for the natural language representation in the language $L_1$ (i=1, 2) indicates specificity of describing the signals.

5. A translation data generation apparatus comprising:
with $L_1$ and $L_2$ being different languages from each other, processing circuitry configured to: execute
a latent variable generation processing that generates, from a natural language representation in the language $L_1$, a latent variable corresponding to the natural language representation in the language $L_1$ by a language $L_1$ encoder, wherein the latent variable is a fixed-length vector;
an index calculation processing that calculates an index for the natural language representation in the language $L_1$ from the natural language representation in the language $L_1$, wherein the index for the natural language representation in the language $L_1$ indicates specificity; and
a natural language representation generation processing that generates a natural language representation in the language $L_2$ corresponding to the natural language representation in the language $L_1$ from the latent variable and the index for the natural language representation in the language $L_1$ by using a language $L_2$ decoder.

6. A data generation model learning method comprising:
a learning step in which a data generation model learning apparatus trains a language $L_i$ generation model (i=1, 2) using first learning data which is sets of sound signals, natural language representations in a language $L_1$ describing the sound signals, and natural language representations in a language $L_2$ describing the sound signals; an index for a natural language representation in the language $L_1$ as an element of the first learning data; and an index for a natural language representation in the language $L_2$ as an element of the first learning data, wherein the index for the natural language representation in the language $L_i$ (i=1, 2) indicates specificity of describing the sound signals, wherein
the language $L_i$ generation model (i=1, 2) is a pair of a sound signal encoder that generates, from a sound signal, a latent variable corresponding to the sound signal and a language $L_i$ decoder (i=1, 2) that generates a natural language representation in a language $L_i$ (i=1, 2) describing the sound signal from the latent variable and a condition concerning an index for a natural language representation in the language $L_i$ (i=1, 2), and the latent variable is a fixed-length vector.

7. A latent variable generation model learning method comprising:
a learning step in which a latent variable generation model learning apparatus trains a language $L_i$ encoder (i=1, 2) that generates, from a natural language representation in a language $L_i$ (i=1, 2), a latent variable corresponding to the natural language representation in the language $L_i$ as a latent variable generation model, the learning being performed through supervised learning using pairs of natural language representations in the language $L_i$ (i=1, 2) describing sound signals and latent variables corresponding to the sound signals as supervised learning data, the natural language representations and the latent variables being generated from the sound signals by a language $L_i$ generation model (i=1, 2) which is a pair of a sound signal encoder that generates, from a sound signal, a latent variable corresponding to the sound signal and a language $L_i$ decoder (i=1, 2) that generates a natural language representation in the language $L_i$ (i=1, 2) describing the sound signal from the latent variable and a condition concerning an index for a natural language representation in the language $L_i$ (i=1, 2), wherein the latent variable is a fixed-length vector, and the index for the natural language representation in the language $L_i$ (i=1, 2) indicates specificity of describing the sound signals.

8. A data generation model learning method comprising:
a learning step in which a data generation model learning apparatus trains a language $L_i$ generation model (i=1, 2) using first learning data which is sets of signals based on sensory information, natural language representations in a language $L_1$ describing the signals, and natural language representations in a language $L_2$ describing the signals; an index for a natural language representation in the language $L_1$ as an element of the first learning data; and an index for a natural language representation in the language $L_2$ as an element of the first learning data, wherein the index for the natural language representation in the language $L_i$ (i=1, 2) indicates specificity of describing the signals, wherein
the language $L_i$ generation model (i=1, 2) is a pair of a signal encoder that generates, from a signal based on sensory information, a latent variable corresponding to the signal based on sensory information and a language $L_i$ decoder (i=1, 2) that generates a natural language representation in a language $L_i$ (i=1, 2) describing the signal based on sensory information from the latent variable and a condition concerning an index for a natural language representation in the language $L_i$ (i=1, 2), and the latent variable is a fixed-length vector.

9. A latent variable generation model learning method comprising:
a learning step in which a latent variable generation model learning apparatus trains a language $L_i$ encoder (i=1, 2) that generates, from a natural language representation in a language $L_i$ (i=1, 2), a latent variable corresponding to the natural language representation in the language $L_i$ as a latent variable generation model, the learning being performed through supervised learning using pairs of natural language representations in the language $L_i$ (i=1, 2) describing signals based on sensory information and latent variables corresponding to the signals as supervised learning data, the natural language representations and the latent variables being generated from the signals by a language $L_i$ generation model (i=1, 2) which is a pair of a signal encoder that generates, from a signal based on sensory information, a latent variable corresponding to the signal based on sensory information and a language $L_i$ decoder (i=1, 2) that generates a natural language representation in the language $L_i$ (i=1, 2) describing the signal based on sensory information from the latent variable and a condition concerning an index for a natural language representation in the language $L_i$ (i=1, 2), wherein the latent variable is a fixed-length vector, and the index for the natural language representation in the language $L_i$ (i=1, 2) indicates specificity of describing the signals.

10. A translation data generation method comprising:
with $L_1$ and $L_2$ being different languages from each other,
a latent variable generation step in which a translation data generation apparatus generates, from a natural language representation in the language $L_1$, a latent variable corresponding to the natural language representation in the language $L_1$ by a language $L_1$ encoder, wherein the latent variable is a fixed-length vector;

an index calculation step in which the translation data generation apparatus calculates an index for the natural language representation in the language $L_1$ from the natural language representation in the language $L_1$, wherein the index for the natural language representation in the language $L_1$ indicates specificity; and a natural language representation generation step in which the translation data generation apparatus generates a natural language representation in the language $L_2$ corresponding to the natural language representation in the language $L_1$ from the latent variable and the index for the natural language representation in the language $L_1$ by a language $L_2$ decoder.

11. A non-transitory computer-readable storage medium which stores a program for causing a computer to function as any of the data generation model learning apparatus according to claim 1 or 3, the latent variable generation model learning apparatus according to claim 2 or 4, and the translation data generation apparatus according to claim 5.

* * * * *